(12) United States Patent
Pulnikova

(10) Patent No.: US 9,875,498 B2
(45) Date of Patent: Jan. 23, 2018

(54) SYSTEM AND METHOD OF GLOBAL ELECTRONIC TRADE IN THE INTERNET

(71) Applicant: Valentina Pulnikova, Villingen-Schwenningen (DE)

(72) Inventor: Valentina Pulnikova, Villingen-Schwenningen (DE)

(73) Assignee: Pulnikova Valentina, Villingen-Schwenningen (DE)

( * ) Notice: Subject to any disclaimer, the term of this patent is extended or adjusted under 35 U.S.C. 154(b) by 844 days.

(21) Appl. No.: 14/450,259

(22) Filed: Aug. 3, 2014

(65) Prior Publication Data

US 2014/0372280 A1    Dec. 18, 2014

Related U.S. Application Data

(63) Continuation-in-part of application No. 13/107,880, filed on May 14, 2011, now abandoned.

(51) Int. Cl.
*G06Q 30/00* (2012.01)
*G06Q 30/06* (2012.01)
(Continued)

(52) U.S. Cl.
CPC ..... *G06Q 30/0625* (2013.01); *G06Q 30/0641* (2013.01); *G06Q 30/08* (2013.01); *G06Q 40/04* (2013.01)

(58) Field of Classification Search
CPC ..... G06Q 30/06; G06Q 50/18; G06Q 30/0609
(Continued)

(56) References Cited

PUBLICATIONS

Unknown author, "E-Business of the Week," InternetWeek, Oct. 29, 2001.*

* cited by examiner

*Primary Examiner* — Brandy A Zukanovich

(57) ABSTRACT

A system and method of global electronic trade in the Internet is provided. The method of global electronic trade for sellers and buyers via the Internet includes registering the sellers and the buyers; providing information regarding goods or services to the registered sellers and buyers; selecting of trade partners based on the provided information; holding tenders; conducting of transactions between the trade partners; conducting a post-transaction procedures; and protecting of information in the system of global electronic trade. In a basis of a method of global electronic trade are put: a method of creating of databases of structured information about offers of sellers and about requests of buyers; and a method of searching of trade partners. The method of creating of databases of structured information in the system of global electronic trade includes: filling an application form by sellers and by buyers; creation of the database of information about proposed goods and services, structured on the basis of the Global Classification of Branches of Economy, Goods and Services (GC) and on the basis of other data, included in this application form; creation of the database of information about requests of buyers, structured on the basis of the Global Classification of Branches of Economy, Goods and Services and on the basis of other data, included in this application form. The method of searching of trade partners includes a method of searching by sellers in database about requests of buyers, a method of searching by buyers in database about offers of sellers, forming a list of results of search, which has the same structure, as the specified databases; a procedure of interactive or automatic selecting of a needed data from the list of result of search.

3 Claims, 25 Drawing Sheets

(51) Int. Cl.
*G06Q 30/08* (2012.01)
*G06Q 40/04* (2012.01)

(58) Field of Classification Search
USPC .............................................. 705/26.1, 27.1
See application file for complete search history.

| Application form of request of buyer to find required goods or services, destined for database of information about requests of buyers ||
|---|---|
| Name of goods or service according to GC | Induction motor ▼ |
| Code of the Global Classification of Branches of Economy, Goods and Services (GC) | 010035003005025 |
| Desired quantity of goods or volume of service | ▼ |
| Desired quality standards of goods or service | ▼ |
| Desired price of goods or service | ▼ |
| Main characteristics of goods or service:<br>1. Grade of motor<br>2. Power, kW<br>3. Rotation speed, rpm<br>4. Height of rotation axis, mm<br>5. Efficiency, %<br>6. Power factor<br>7. Nominal current, A<br>8. No load current, A<br>9. International Protection<br>10. IM-code | |
| Country of location of the producer | ▼ |
| Additional requirement of buyer | |
| | Send data to database of information about requests of buyers |

Fig. 6.

| Application form of offers of the seller, destined for database of information about proposed goods or services ||
|---|---|
| Name of goods or service according to GC | Induction motor |
| Code of the Global Classification of Branches of Economy, Goods and Services (GC) | 010035003005025 |
| Price of offered goods or service | |
| Quantity of offered goods or volume of service | |
| Quality standards of offered goods or service | |
| Main characteristics of goods or service:<br>1. Grade of motor<br>2. Power, kW<br>3. Rotation speed, rpm<br>4. Height of rotation axis, mm<br>5. Efficiency, %<br>6. Power factor<br>7. Nominal current, A<br>8. No load current, A<br>9. International Protection<br>10. IM-code | |
| Country of location of the producer | |
| Additional information of seller | |
| | Send data to database of information about proposed goods and services |

Fig. 7.

| Application form of request of buyer to find required goods or services |||
|---|---|---|
| Name of goods or service according to GC | Induction motor | ▼ |
| Code of the Global Classification of Branches of Economy, Goods and Services (GC) | 010035003005025 ||
| | Start a search of required goods or service ||

Fig. 9.

| Application form of request of seller to find buyers for offered goods or services |||
|---|---|---|
| Name of goods or service according to GC | Induction motor | ▼ |
| Code of the Global Classification of Branches of Economy, Goods and Services (GC) | 010035003005025 ||
| | Start a search of buyers for offered goods or service ||

Fig. 10.

SYSTEM AND METHOD OF GLOBAL ELECTRONIC TRADE IN THE INTERNET

CROSS-REFERENCE TO RELATED APPLICATIONS

This application is continuation in part of application Ser. No. 13/107,880, filed on 14 of May, 2011, now abandoned.

BACKGROUND

1. Field of the Disclosure

This invention relates, in general, to electronic commerce and, particularly, to global Business-to-Business trade in the Internet.

2. Description of the Related Art

At present there are three well-known forms of electronic trade:

1. Business-to-Individual. The Web site Amazon.com is a typical example of this trade form. In this form electronic shops sell consumer goods to individual buyers. In general this is a retail trade.

2. Individual-to-Individual. The well-known Web site e-bay.com is an example of this trade form. In this case individual sellers sell consumer goods to individual buyers. Generally this is also a retail trade.

3. Business-to-Business (B2B). There are a number of Web sites operating in this form, such as eceurope.com, esourses.co.uk, wand.com, tbc-world.com, globalsourse.com, perfect.com, freemarkets.com, metalsite.com, enron.com, busytrade.com, marginup.com, allactiontrade.com, b2bquote.com and others. In this form a company wholesales products and services to another company.

Characteristic features of all sites of B2B trade form are the availability of registration of a user of the site, the availability of an expanded catalogue of goods and services including different branches of industry and services, the availability of a seller section and a buyer section.

Disadvantages of existing B2B sites include:
Absence of databases with offers of sellers and buyers, where this information would be structured, that does not allow to carry out fast highly effective search of trading partners (Visual viewing of the available information is offered basically in existing sites that demands a lot of time);
The absence of information on prices of proposed goods and services;
The absence of information on the quality and technical characteristics of proposed goods and services;
The absence of a possibility of a various selecting of goods and services according to wishes of buyers or sellers;
The absence of possibility for announcing and holding tenders;
In general, the existing sites are informational sites, and therefore there are no options for contracts and transactions in the frame of these sites;
Most existing sites take no measures for restricting an access for unwanted users, who can impede the normal operation of the site; and
Limited multilingual support.

At present, trade by goods and services between companies encounters problems, which especially concern companies producing means of production and offering Industrial and technological services. The above-mentioned Web sites try to solve problems of electronic B2B trade and offer expanded data catalogues. Existing B2B sites accept information from users about buying and selling goods or services, which is not structured in any way. That is, information about goods and services is delivered in trading sites by the user in arbitrary kind. Users at will give the full or short name of production, services, arbitrarily specify their quality indicators if consider it necessary, arbitrarily give the additional information about products and services, about the producer if consider it necessary etc. Such, not structured, information about goods and services is contained in databases of these sites. To organize fast and highly effective search of information about the needed goods and services in such databases is not possible. For this reason the search of the needed information in existing trade sites is extremely complicated and low effective. The user should look through visually available information for the purpose of search of the needed information in the majority of existing sites. Visual viewing of the available information on a site even within any one section (for example, "inorganic chemistry") will demand very considerable time as the nomenclature of the goods in this section can have many thousands names. The impossibility of application of a fast and highly effective method of search of the needed information in databases of sites of B2B trade in the conditions of presence of not structured information in databases considerably constrains expansion of B2B trade in the conditions of the Internet. In the conditions of absence of the structured information about goods and services in databases of B2B sites is impossible to carry out required selecting from the list of the information, received by the user.

Further, available information in sites about goods and services is often incomplete. Typically, information about prices of goods or services, of delivery is missing on existing sites of electronic trade. Therefore, for example, a buyer must contact a number of producers in order to make an inquiry about the price and properties of goods. The absence of complete information about goods or services impedes searching of trade partners.

Thus, there exists a deficiency of information on possible partners, prices, requirements to goods and services, which makes it difficult, for example, for producers to perform an analysis of the efficiency of their business transactions, to make plans of production of goods and services, to carry out an analysis of their own prices and compare them with the prices of other producers. It is also difficult, for example, for buyers to compare prices of sellers, to make a comparison of quality performances of goods and services, and to make an analysis of the market. These current limitations impede the progress of the world market.

Another problem is a classification of branches of industry, and of other directions of activity, goods and services in the global system. This problem impedes a high-quality search for trade partners because there are potential sources of inaccuracies during forming of databases and during searching since the same goods can belong to different categories.

Another problem is the fact that existing sites of B2B electronic trade are not really global. They are regional or branch-wise in general.

Another problem is reliability, confidentiality and security of information allocated in Web sites, which on the alert keeps companies and, again, impedes business.

Additionally, there is a problem with reliability of a contract, concluded with trade partner, found with the help of B2B Web site. B2B Web sites do not help users to solve this problem. Generally, they provide information only. The specified problem also constrains development of trade operations in the conditions of the Internet.

Another problem concerns the absence of tenders in B2B sites. Since B2B sites limit their service by informational support, they do not offer a possibility for tenders.

Accordingly, systems and methods are required that decide these problems in the global wholesale trade.

SUMMARY

An aspect of the invention discussed here is to provide a system and method for improvement of the global electronic world trade in the Internet. According to an aspect of the present invention, a system of global electronic trade via the Internet for users includes: sellers and buyers as equitable trade participants of the system of global electronic trade, a host server including a databases and a Web-site or network communication program; and user computers, capable to communicating with the host server, wherein the host server provides functioning of a method of global electronic trade.

According to an aspect of the present invention, a method of global electronic trade for sellers and buyers via the Internet includes: registering the sellers and the buyers; providing by information regarding goods or services to the registered sellers and buyers; selecting trade partners based on the provided information; holding tenders of the trade partners; conducting transactions between the trade partners; conducting of a post-transaction procedures; and protecting of information in the system of global electronic trade.

According to an aspect of the present invention, the method of global electronic trade in the Internet besides includes:

creation of a database of a Global Classification of Branches of Economy, Goods and Services (GC);

creation of a database of information about goods and services, proposed by sellers, where the information is structured on the basis of the Global Classification of Branches of Economy, Goods and Services (GC);

creation of a database of information about requests of buyers, where the information is structured on the basis of the Global Classification of Branches of Economy, Goods and Services (GC);

creation of a database of confidential information about legal entities for preparation of contracts and other official documents in a frame of the system of global electronic trade in the Internet on the basis of data, provided by users during registration;

creation of a database of open information about legal entities;

method of search of trade partners in the database of information about proposed goods and services and in the database of information about requests of buyers, where the information is structured on the basis of the Global Classification of Branches of Economy, Goods and Services (GC);

procedure of fulfillment of an interactive or an automatic selecting of data from the list of results of search;

a method of Controlled Advanced Payment (CAP), providing an increase of reliability of a transaction.

According to an aspect of the present invention, the procedure of registration in the system of global electronic trade, includes: filling a registration form for subsequent check of data provided by a user into the registration form, for using these data for a contract preparation and for preparation of other official documents; inserting a scanned signature or seal into the registration form; sending a letter to the user with a password and code generator; and encoding the electronic signature and the seal.

According to an aspect of the present invention, a method of creating of databases of information in the system of global electronic trade includes: filling an application form by sellers or by buyers for inserting their data in the information database; creation of the database of information about proposed goods and services, structured on the basis of the Global Classification of Branches of Economy, Goods and Services (GC) and on the basis of other data, included in this application form; creation of the database of information about requests of buyers, structured on the basis of the Global Classification of Branches of Economy, Goods and Services (GC) and on the basis of other data, included in this application form.

According to an aspect of the present invention, the method of searching of trade partners includes a procedure of search of goods or services in the database of information about proposed goods and services, structured on the basis of the Global Classification of Branches of Economy, Goods and Services (GC), and in database of information about requests of buyers, structured on the basis of the Global Classification of Branches of Economy, Goods and Services (GC); forming a list of results of search, which has the same structure, as the specified databases, and which is cached on the server side; a procedure of interactive or automatic selecting of a needed data from the list of result of search.

According an aspect of the present invention, the system and method have sufficient reliability for holding a transaction. The reliability of the method is provided during a registration stage, as well as during creating, searching, selecting of information and protection of information. The system and method include special procedures for holding tenders, concluding contracts, assisting with payments and offering post-transaction services, the special security procedure.

According to an aspect of the present invention, the method of global electronic trade in the Internet includes: choice of trade partner in result of searching; conducting negotiations; concluding of the contract in case of a successful negotiation by signing the contract with an electronic signature or seal, and verifying the electronic signature or seal; transfer of required money; conducting a transaction procedure by reacting to possible conflict situations during realization of a contract, concluded in the frame of the system of global electronic trade.

According to an aspect of the present invention, the buyers and sellers can announce and hold tenders. If a buyer announces a tender, he can do it in two different modes. In the first mode, the information about tender is automatically sent to partners via internal e-mail. The partners are selected on the basis of the declared demands of the buyer. In the second mode, the buyer sends information on the tender to the desired partners only. The participants of the tender are requested to send their offers to the organizer of the tender. In this case the tender is held as a competition. After stipulated time, the organizer of the tender declares the result to the participants of the tender. If a seller announces a tender, he can follow the same two modes. The organizer of the tender announces the time frame of the tender and the initial price. In this case the tender is held as an auction.

According to an aspect of the present invention, the trade partners can conclude a transaction either in the frame of the system or outside the system. If the transaction is concluded within the frame of the system a number of standard contracts are offered. The contract is stored in the database for a stipulated time. The payments can be realized via the system by means of the Controlled Advanced Payment (CAP) for better of reliability of a transaction. In this case, a buyer transfers the money to the account of the system. After that the system informs the seller about the money transfer by the buyer. After this message the seller is expected to deliver goods or offer services according to the contract. If everything is normal, the buyer sends no messages to the system, and the system automatically transfers the money to the seller's account according to terms specified in the contract. The transaction is finished successfully. In case of conclusion the contract in the frame of the system both trade partners get benefit in view of the information about number of the contracts realized in the frame of the system.

Additional aspects will be set forth in part in the description which follows and, in part, will be apparent from the description and drawings, and from the claims.

BRIEF DESCRIPTION OF THE DRAWINGS

These and/or other aspects and advantages of the invention will become more readily appreciated from the following description of the invention, taken in conjunction with the accompanying drawings of which:

FIG. 6 is an example of an application form of request of buyer to find required goods or services, destined for database of information about requests of buyers;

FIG. 7 is an example of an application form of offers of the seller, destined for database of information about proposed goods or services;

FIG. 9 is an example of an application form of request of buyer to find required goods or services;

FIG. 10 is an example of an application form of request of seller to find buyers for offered goods or services;

DETAILED DESCRIPTION

Figure 1:
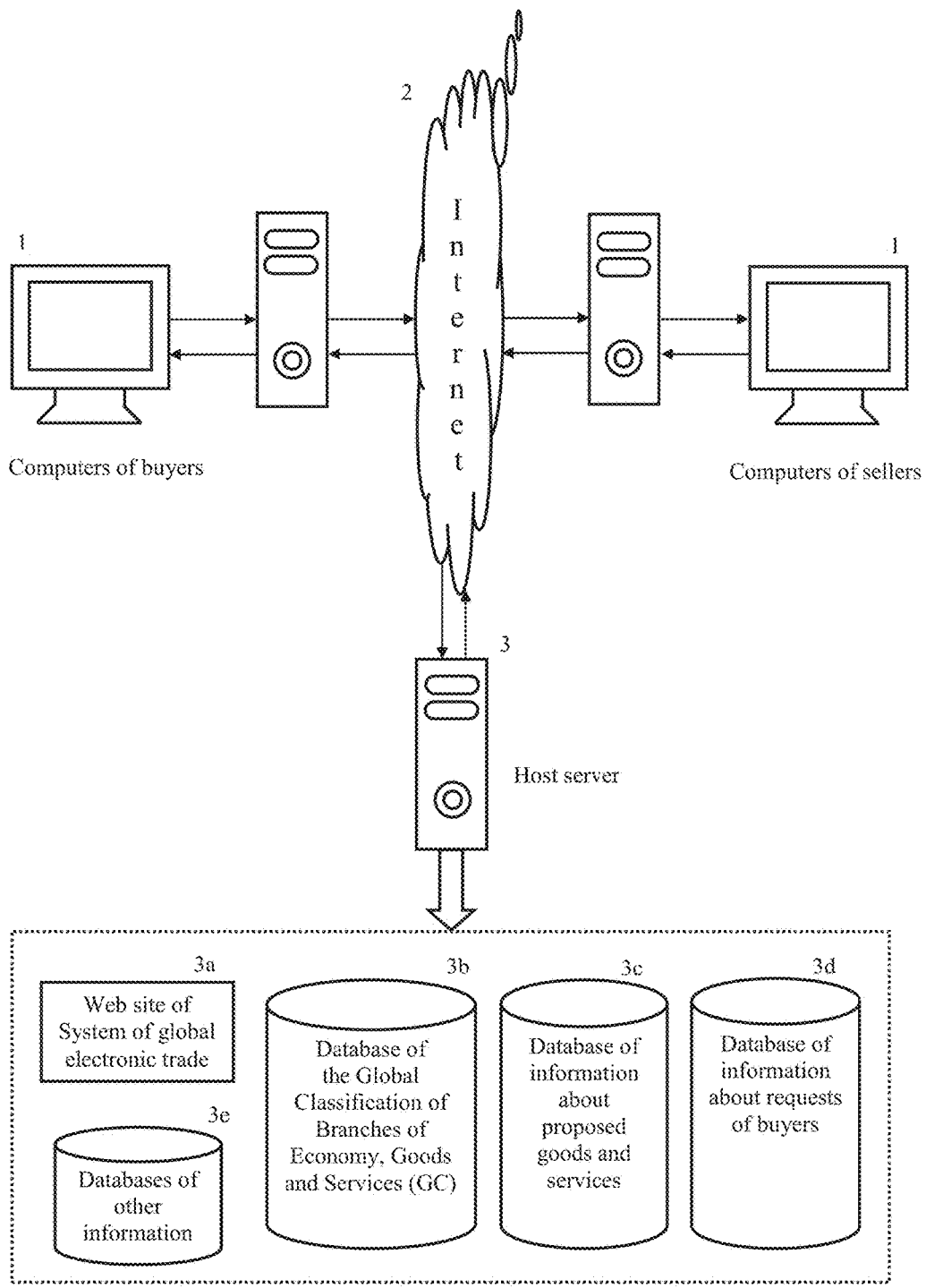
FIG. 1 is block diagram of a system of global electronic trade in the Internet.

The main goal of the system of global electronic trade is to help sellers to sell the goods or services, and to help buyers to buy the needed goods or services. The system of global electronic trade, proposed in the given invention, provides users of system with necessary information. The system of global electronic trade gives to buyers the information about the proposed goods and services, available in a database of the system. The system of global electronic trade gives to sellers the information about buyers of the goods and services, available in a database of the system. Users of the system of global electronic trade possess the information about the offered and demanded goods and services.

In the given invention the method of acquisition, storage and replenishment of the information, which comes from users of system, buyers and sellers, is offered. The basic problem, which is decided in offered system of global electronic trade, is the problem of structurization of the information, which comes from users of system, sellers and buyers. If the system of global electronic trade will accepts the information from users about goods and services, demanded for users or offered for sale, in any arbitrary kind and to store this information in any arbitrary kind in the databases of system, then a search of the necessary information in such databases will be extremely complicated and a lot of time will demand. In this case a fast and highly effective search of the necessary information about buying and selling goods and services is impossible.

Structurization of the information, which comes in the system of global electronic trade, a storage of the information in the databases of the system in the structured kind is necessary for the fast and highly effective search of the demanded goods and services for the buyer and for the fast and highly effective search of buyers of the goods and services for the seller. In our understanding, the structurization of the information this not only ordered and logic placing of the interconnected elements of the information. For the automated information search it is necessary also that all same elements of the information have been absolutely uniquely defined. So the system of global electronic trade will offer to users the names of goods and services, the list of the basic names of indicators of quality for every name of the goods and services, units of the prices, volumes etc. As the basic search in the system of global electronic trade, on the one hand by sellers of buyers, on the other hand by buyers of needed goods and services, will be carried out by means of the name of goods and services, then for use of automatic search it is necessary that the buyer and the seller the name of the same goods or service have defined strictly uniquely.

For this purpose in the proposed invention the structurization of names of the goods and services in the system of global electronic trade is offered to be carried out by means of the Global Classification of Branches of Economy, Goods and Services (GC). Sellers and buyers will use this classification at insertion of the name of goods and services in a certain place of an application form for transfer of the data to the database of the system of global electronic trade and at preparation of request to the system for a search of the necessary information. In this case the automated search of each other by sellers and buyers within the frame of the system of global electronic trade is possible.

The Global Classification of Branches of Economy, Goods and Services (GC) represents classification of known branches of economy, the goods and services. Now there are various international and national classifications of branches of economy, the goods and services. The international classifications of branches of economy are: the International Standard Industrial Classification of All Economic Activities of the United Nations, the Industry Classification Benchmark (ICB), the Statistical Classification of Economic Activities in the European Community and so on. As an example of national classifications of branches of economy it is possible to present the Standard Industrial Classification (SIC) of USA, the United Kingdom Standard Industrial Classification of Economic Activities, the Russian Economic Activities Classification System (OKVED) and so on. There are also numerous product classifications, for example: the Central Product Classification (CPC) of the United Nations Statistical Commission, the Standard International Trade Classification (SITC) of the United Nations, the General Agreement on Trade in Services (GATS) of the World Trade Organization (WTO), the United Nations Standard Products and Services Code (UNSPSC), Eclass (Germany), the Electronic Commerce Code Management Association (ECCMA), the Russian classifier of production (OCP) and so on. "International Classification of Goods and Services", created for the purposes of the registration of marks by the Word Intellectual Property Organization, Geneva, 2001, exists also. Besides, there are numerous catalogues: branch national catalogues of production and catalogues of production of the separate companies. There is free or any other access to the majority of the specified classifications.

The Global Classification of Branches of Economy, Goods and Services (GC) should be based on the material, listed above and other. However, classifications of branches of economy existing now, classifications of the goods and services have been created basically for the purposes of statistics and not intended for the usage in electronic trade in the Internet. Therefore a modification of the existing classifications for the purpose of creation of the Global Classification of Branches of Economy, Goods and Services (GC), which suits for the usage in the system of global electronic trade in the Internet, is necessary. This modification includes the development of the classification of the known goods and services on a branch principle, development of unique names of branches of economy, the goods and services, which can have different names in the different countries or in different International classifications, creation of short characteristics of the goods and services included in classification, translation of the classification into the main languages.

The Global Classification of Branches of Economy, Goods and Services (GC) is classification representing the hierarchical treelike structure constructed by a branch principle. It means that root vertices of the classification represent key branches of economy, for example: agriculture, the industry, transport, power engineering, building etc. Vertices of following level represent branches of key branches of economy, for example for the industry: machine-building industry, metallurgy, the chemical industry, manufacture of building materials etc. Vertices of a following level represent subbranches of economy, for example for machine-building industry: aircraft industry, automotive industry, electrical-machine building, shipbuilding etc. Vertices of the last level (the leave vertices) represent names of end-products (goods or services). Vertices of each level have a code, which consists of codes of all parental vertices and the code of the vertex. The code of the goods or services consists of the code of the goods or services and codes of all parental vertices of the classification. Vertices of the last level (the leave vertices) except the name and the code of the goods or services include main characteristics of goods or services, specific to the given goods or services. The main characteristics of goods or services include the main technical characteristics of goods or services and the basic performances of quality of the goods or service. These main technical characteristics and performances of quality in the future will be included in criteria for selecting of the needed data from results of search. The Global Classification of Branches of Economy, Goods and Services (GC) comprises existing branches of economy, goods and services. The Global Classification of Branches of Economy, Goods and Services (GC) can be realized by means of a relational database (for example, MySQL, Oracl and so on) or by means of other database, working with treelike hierarchical structure (for example, MongoDB and so on). Process of creation of the database of the Global Classification of Branches of Economy, Goods and Services (GC) is labour-consuming, but quite realizable process. This process can be automated by means of specially written programs with the language SQL or Java Enterprise Edition. Text files with the content of each parental vertex of the classification will be used for creation of the database of the classification. Forming of these files is also labour-consuming, but quite realizable process.

In this invention a system of global electronic trade via the Internet for users (FIG. 1), including sellers and buyers as equitable trade participants is proposed. The system of global electronic trade in the Internet comprises at least combination of:

a host server (3) including databases (3b, 3c, 3d, 3e) and a Web site (3a) or other network communication program with multi-language support; and user's computers (1) capable of communicating with the host server by means of the Internet (2);

a database of the Global Classification of Branches of Economy, Goods and Services (GC) (3b) representing by itself a hierarchical tree with names and corresponding numbers (codes) of all divisions and subdivisions of branches of world Economy, where a terminal divisions and subdivisions of branches of world Economy comprise names and corresponding numbers (codes) of goods and services, including a characteristics of goods and services;

a database of structured information about proposed goods and services (3c);

a database of structured information about requests of buyers (3d);

a databases of other information of the system of global electronic trade (3e).

Users can access the Web site of the system of global electronic trade in the Internet from their computers by means of a Web browser. They can acquire the information necessary for business and execute transactions. After entering the main page of the Web site a user can work either as a registered user or in a free access mode. In the free access mode a user can:

get acquainted with the rules of working in the Web site of the system of global electronic trade in the Internet and to get access to other official regulating documents available in different languages of the world;

familiarize with the registration procedure;

to get access to offers of sellers and buyers;

familiarize with the structure of the site, and so on.

The Web site does not grant an access to the data of sellers or buyers for unregistered users.

Figure 2:
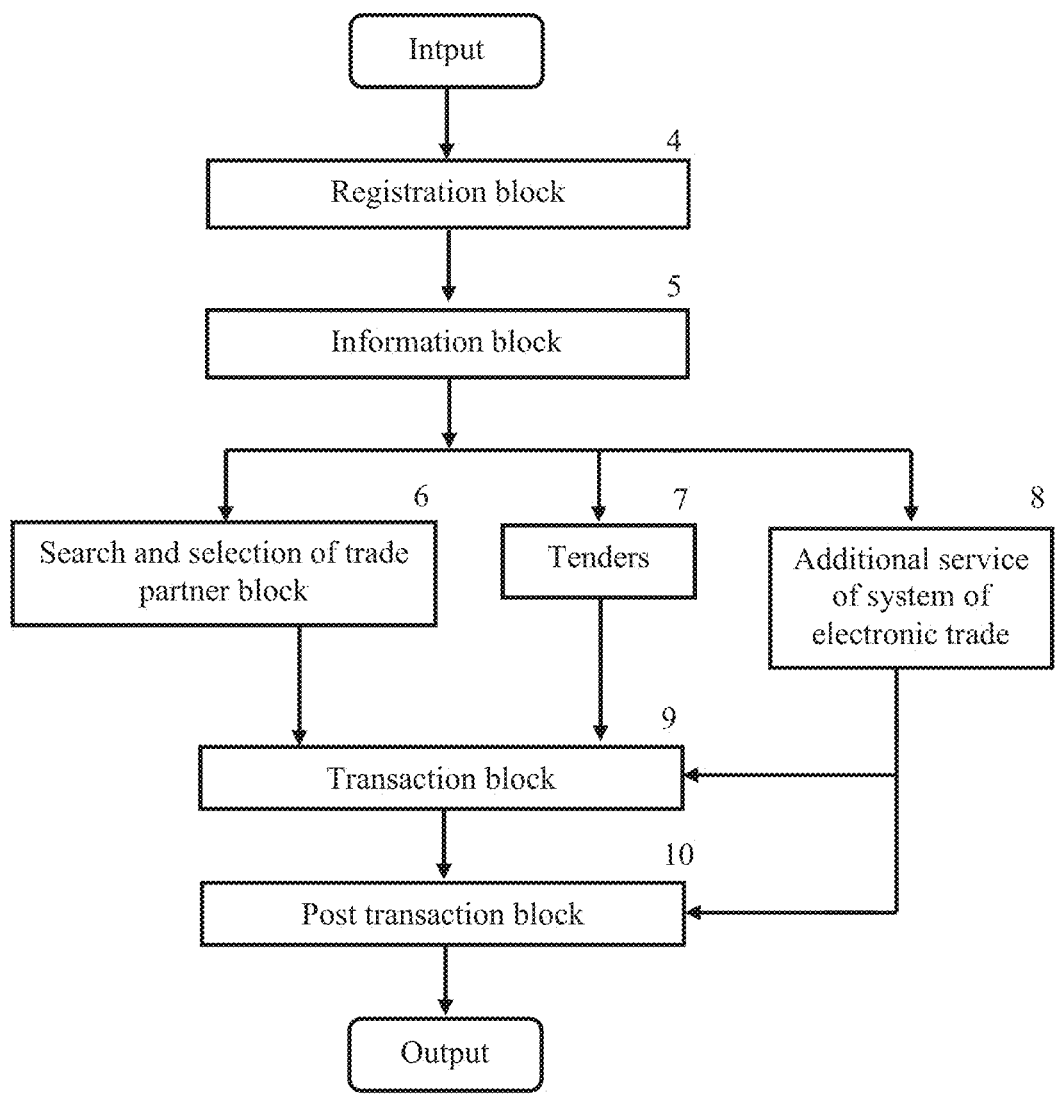
FIG. 2 is a diagram of a method of global electronic trade in the Internet.
Figure 25:
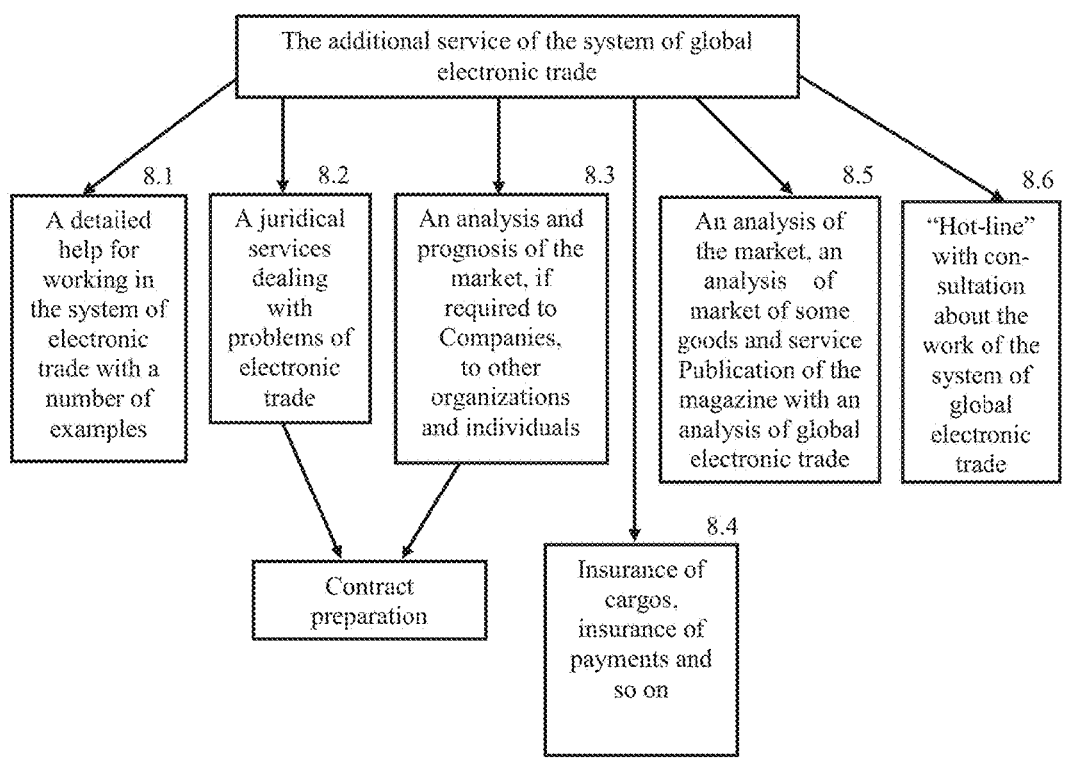
FIG. 25 is a flowchart showing additional services of the system of global electronic trade; and, FIG. 26 is a flowchart showing a procedure of protecting of information in the system of global electronic trade.
Figure 26:
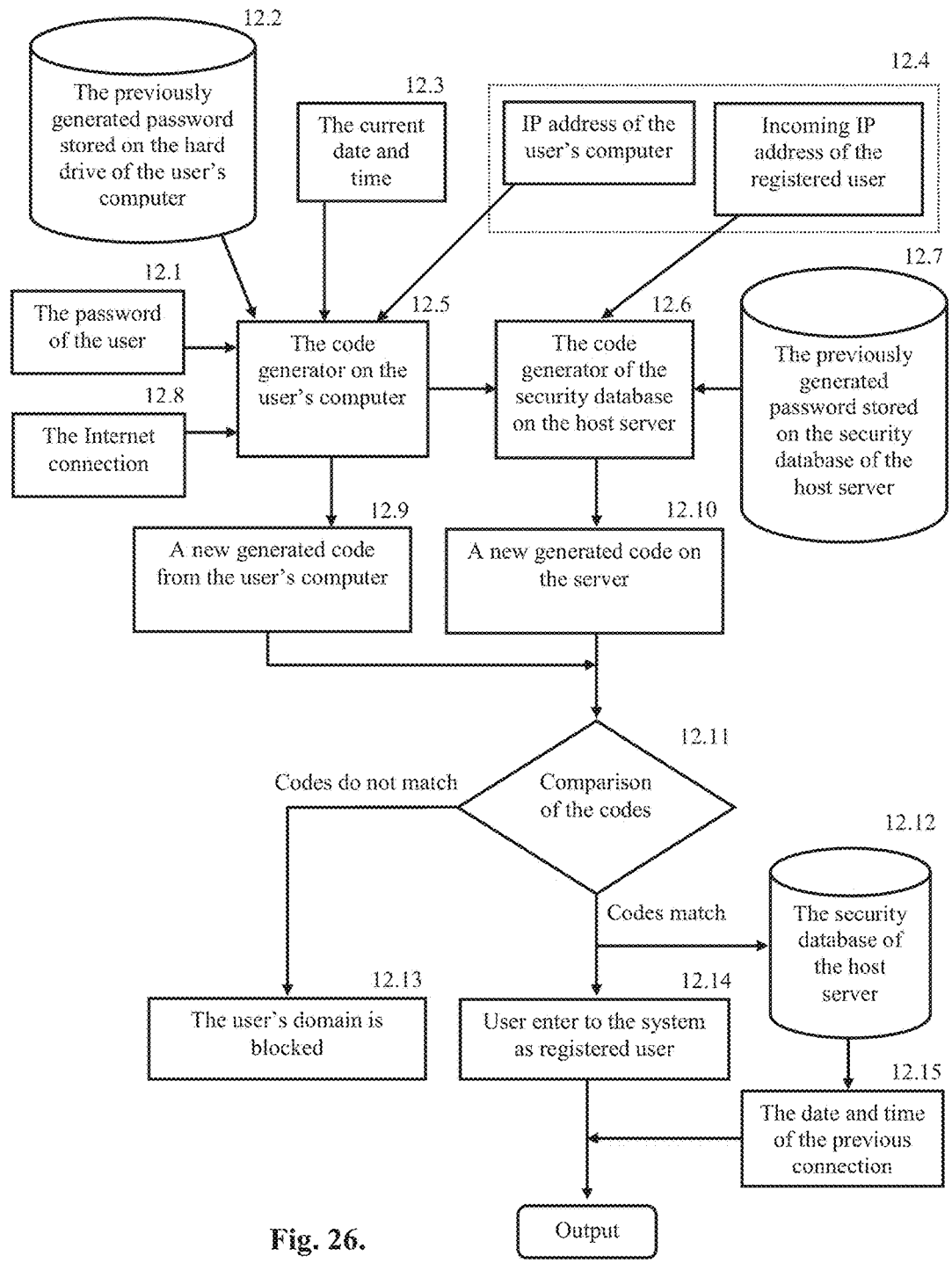

According to the invention, a method of global electronic trade it is possible to illustrate by means of the block diagram (FIG. 2), which includes a registration block (4—see FIGS. 3 and 4), an information block (5—see FIGS. 4-7), a block of search and selecting of trade partners (6—see FIG. 8-17), a block of the tenders (7—see FIGS. 22 and 23), a transaction block (9—see FIG. 18-21), a post-transaction block (10—FIG. 24), and a block of additional services of the system of global electronic trade (8—see FIG. 25), protecting of information in the system of global electronic trade (FIG. 26).

Procedure of the registration of users has some purposes:

to obtain from users the data, which are confidential and which will be used during of process of forming a database about users of the system of global electronic trade;

to provide reliability of the data about users, who will be used during process of searching of trade partners;

to obtain from users the data, which are confidential and which will be used at the conclusion of contracts;

to provide the user with the password for an input in the system of global electronic trade.

Figure 3:
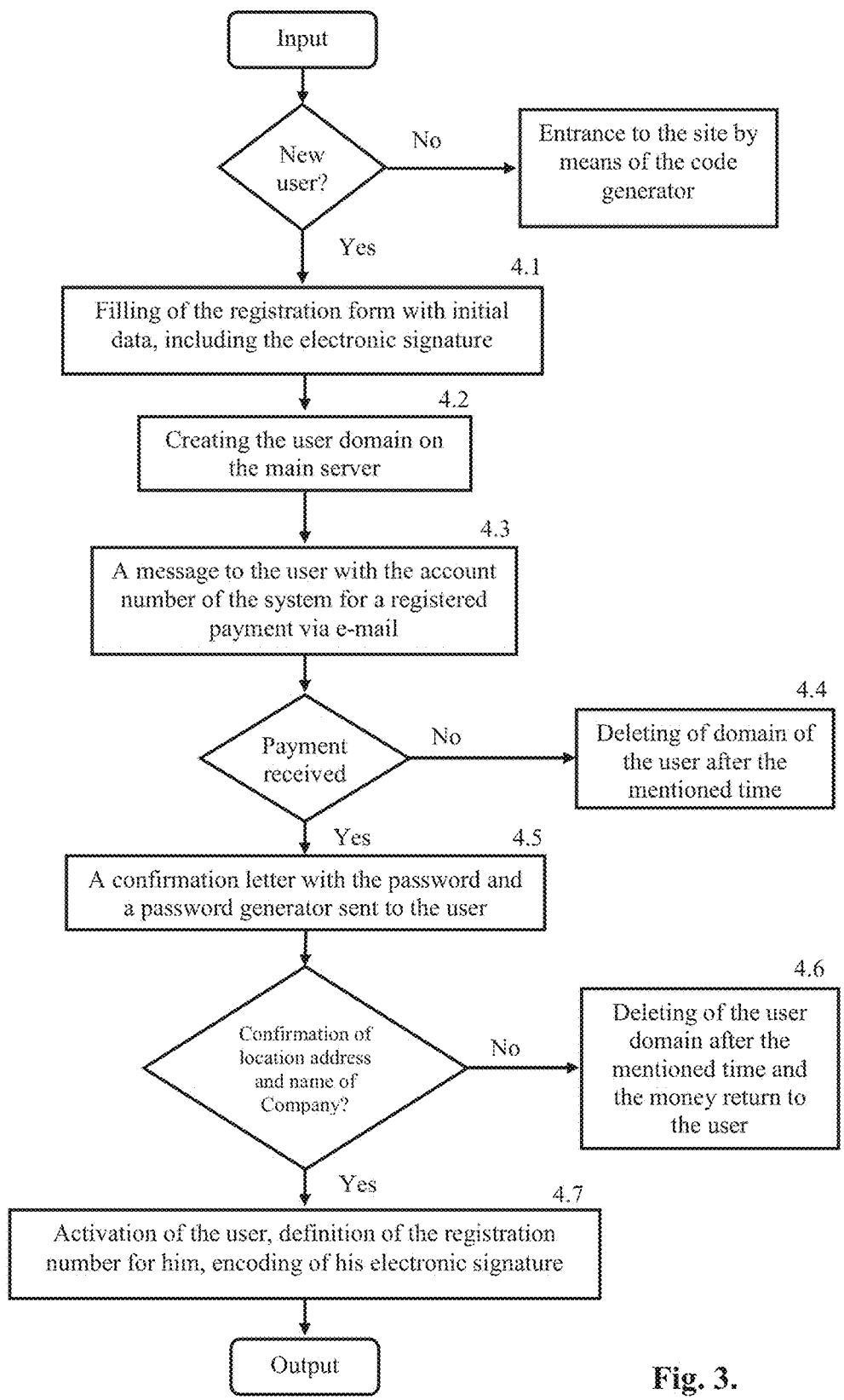
FIG. 3 is a flowchart showing registration in the system of global electronic trade in the Internet

In order to register, the user must fill a registration form (4.1) (FIG. 3). This form includes data about legal entities: a name of a legal entity, a state registration number of the legal entity; a date of registration of the legal entity by a state agency; a legal address; a location address of the legal entity; an e-mail address and a telephone number of the legal entity.

We shall understand as legal entities: companies, societies and individual businessmen.

The user has to fill in the registration form a name and a job position of an official representative, who will sign contracts and other official documents on the behalf of the legal entity.

The company provides an example of the official scanned signature of the official representative. Companies having seals according to articles of association provide a sample of a scanned print of the seal.

If the user is an individual businessman, he includes his name in the registration form, a state registration number and a date of his registration as of an individual businessman by a state agency, a location address, an e-mail address and a telephone number. An individual businessman has to give a scanned image of his signature.

This information is considered confidential and will not be published in the freely accessible parts of the site. This information can be used for the contract preparation and other official documents of the system of global electronic trade.

The system creates a user domain in the database of the system for a new user (4.2). In this domain all data of the user will be stored.

Then the system will send a message (4.3) to the provided e-mail address of the user with an account number of the system of global electronic trade, where the user must provide a registration fee. This fee is intended to discourage casual users who can potentially impede the normal operation of the system.

In case no payment is received during a certain period, then the system deletes the allocated user domain with the all data (4.4).

After receiving the registration fee, a letter is sent to the user with a password for entrance in the system, with a password generator (code generator) by an express post (4.5) and with a notification of the reception. A contract with a postal service will oblige the service to confirm the location address of the legal entity and the name of the legal entity. Once the data is acquired a post office will send it to the system.

The system of global electronic trade deletes the user domain and returns the registration fee to the user, in case of an absence of the confirmation by the post office of the location address of the legal entity and the name of the legal entity (4.6).

In case of confirmation by the post office of the location address of the legal entity and the name of the legal entity, the system activates the user (4.7) and provides a registration number of user of the system of the global electronic trade in the Internet. The system of the global electronic trade in the Internet creates electronic codes of the signature and of the seal of the legal entity.

After receiving the password, the user becomes a registered user of the system. But in order to make transactions the user is required to enter the signature code, which will be also sent by post. The signature code will put the electronic signature in a contract or any other documents of the system of global electronic trade. The user will be able to work in the system only from the same IP address as provided during registration. The user will also get specially designed code generator. The user will be able to access the registered user domain only through this generator. The generator will be activated by the password received by the user. The same generator will also operate in the host server. The programs are identical. This way a couple of matching passwords will be generated at a new login. The program will generate a new password taking into account a combination of previously generated passwords, generation time and IP address. Thus a dynamic password will secure the connection between the registered computer of the user and the system.

The manually introduced signature code will provide an extra protection of the user domain, if the registered computer is accessed by an unauthorized person. The system will record the last few logins as well as the last few performed actions, which will inform the user about any unauthorized actions conducted on his behalf. Of course, from the user will be requested to keep the signature code in a secure location. If the code is lost or could be seen by an outsider the user must request a new code immediately.

Upon a user request, a list of IP addresses will be accepted. Each new IP address will be provided with the password and a password generator, i.e., this generator will be different for each new IP. The same generator will be operating in the host server in order to provide a match.

These measures will lead the security of the system to considerably higher level.

After filling of registration form the user concludes an agreement with the system. This way the user confirms his responsibility for any breach of the national and International laws.

A user will be able to modify the name of the company, the state registration number and the legal address. But in order to activate changes the user must repeat the registration procedure.

Figure 4:
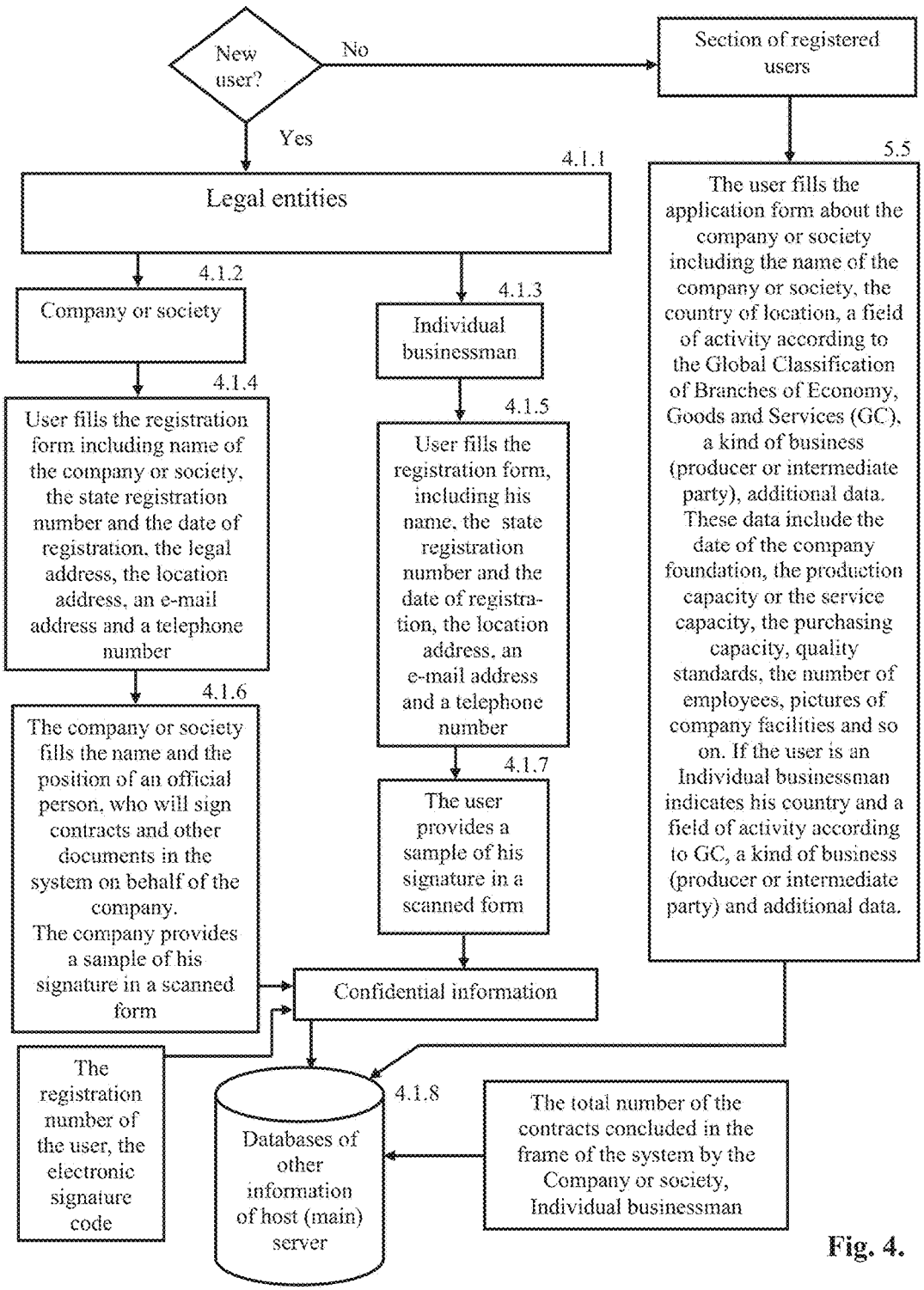
FIG. 4 is a flowchart showing a process of collecting of information about users.

The information block includes the following databases. The first part of the database of legal entities, e.g., companies, individual businessmen (the database of confidential information about legal entities) is formed on the basis of data obtained during registration procedure (4.1.1-4.1.8) (FIG. 4). This database comprise for a legal entity: a name of the legal entity; a state registration number of the legal entity; a date of registration of the legal entity by a state agency; the legal address of the legal entity; a location address of the legal entity; a e-mail address and a telephone number of the legal entity; a name and a job position of an official representative of the legal entity, who can sign contracts and other official documents on a behalf of the legal entity; a scanned signature of this official representative of the legal entity; an electronic code of the signature of this official representative of the legal entity; a scanned seal of the legal entity; an electronic code of the seal of the legal entity. This information is considered confidential. This information will be used for preparation of contracts and other official documents in the frame of the system of global electronic trade.

Another part of information about legal entities (FIG. 4) is formed on the basis of data provided by the legal entities in the application forms (5.5) after registration in the system of global electronic trade (the database of open information about legal entities). These data include for any legal entity: a name of the legal entity, a country of location, a field of activity according to the Global Classification of Branches of Economy, Goods and Services (GC), a kind of business (producer or intermediate party). There is a possibility for legal entities to provide additional information for a general use. This additional information includes a date of a foundation of the legal entity, capacity of the production or service, purchasing capacity, quality standards, number of employees, pictures of facilities and so on. More detailed information about companies a user can find on sites of companies, addresses of which can be included as additional information about the company.

Data about a legal entity will include the total number of contracts concluded in the frame of the system also. This record will be done by the system of global electronic trade automatically.

Figure 5:
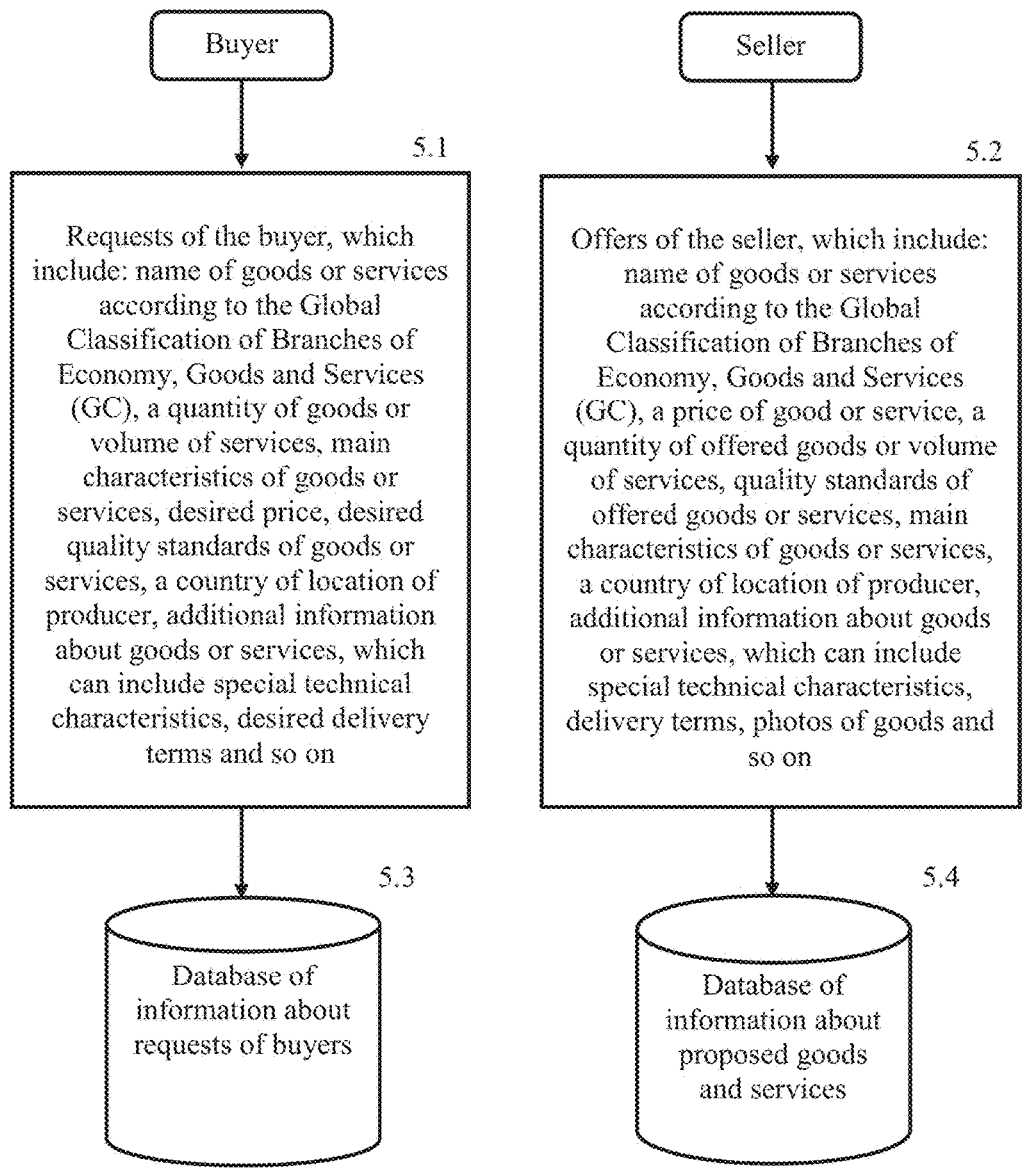
FIG. 5 is a diagram showing a process of collecting structured information about proposed goods and services and about requests of buyers.

Other databases are the database of information about requests of buyers and the database of information about proposed goods and services (FIG. 5). The database of information about requests of buyers (5.3) is formed on the basis of requests of buyers (5.1). The buyer fills the application forms (FIG. 6), where he has to provide name of goods or services, which he wants to buy.

The buyer has to specify a name of the needed goods or service in accordance with the tree of the Global Classification of Branches of Economy, Goods and Services (GC). He can type the name of the needed goods or service in the field of the name. If there is such name of the goods or service in the Global Classification, then the code of the goods or service will appear in the field of the Global Classification of Branches of Economy, Goods and Services (GC). After a choice of the name of the goods or service in the field of "main characteristics of specified goods or service", the concrete name of "main characteristics of goods or service", which are available in the database of the Global Classification of Branches of Economy, Goods and Services (GC) for each goods and service, will appear. The buyer can indicate desired quantity of goods or volume of service, values of main characteristics of goods or service, desired price of goods or desired price of volume of service, desired quality standards of goods or service, a country of location of producer.

The system of global electronic trade will suggest to choose a dimension of the data from the pop-up list and will define a format of the data, at entering of the data in the field of the data "desired quantity of goods or volume of service" and "desired price of goods or service" of the application form. The system of global electronic trade will suggest to choose names of local or international quality standard from the pop-up list, at entering of the data in the field of the data "desired quality standards of goods or service" of the application form. The system of global electronic trade will suggest to choose for goods or service, specified by the buyer, the name of the country from the pop-up list, at entering of the data in the field of the data "the country of location of producer" of the application form. The system of global electronic trade will suggest to choose names of corresponding parameters, dimension of the data from the pop-up list and will define a format of the data, at entering of the data in the field of the data "main characteristics of goods or service" of the application form. Thus, the system of global electronic trade will define names, codes, dimension and the format of the abovementioned data. These data is considered main and used by the system of global electronic trade for search and selecting of trade partners. Additionally buyers can require certain special technical characteristics of required goods or service, desired delivery terms and so on. If the buyer wants, that the data of his request have been placed in the database of the information about requests of buyers and that sellers could find them, he will press the corresponding button on the application form. Thus, the buyer insert in the application form following data: a name of goods or service and a code of goods or service in conformity with Global Classification of Branches of Economy, Goods and Services, a quantity of goods or volume of service, main characteristics of goods or service, a desired price of goods or service, a desired quality standards of goods or service, a country of location of producer, an additional information about goods or service.

Names and numerical values or codes of the specified above data will be recorded in corresponding places of the database of the information about requests of buyers. For example in case of the relational database the data about request of the buyer will occupy one row of the database. Numerical values or codes of the specified above data will be recorded in corresponding columns of the database. Thus, the system of global electronic trade in the Internet records in the database of structured information about requests of buyers following data: the name of goods or service and the code of goods or service in conformity with Global Classification of Branches of Economy, Goods and Services, the quantity of goods or volume of service, main characteristics of goods or service, the desired price of goods or service, desired quality standards of goods or service, the country of location of producer, the additional information about goods or service.

Besides in a database about requests of buyers the information with the data about the buyer will be placed from the database of information about legal entities: a name of legal entity of the buyer, a country of location of the buyer. As a result the database of the information about request of the buyers will represent the structured database. A basis of structurization of the database of the information about requests of the buyers is the Global Classification of Branches of Economy, Goods and Services (GC). The search by sellers of buyers of his production from the database of the information about request of the buyers will be carried out on the basis of codes of the GC. Other data in the database of information about requests of buyers also is structured as they have the strictly certain place in the database and have the strictly certain format of the data. They will be used for selecting of the needed data from the results of search. If the buyer does not fill any data in the application form, this data cannot participate in selecting.

The database of information about proposed goods and services (5.4) is formed on the basis of offers of sellers (5.2). The seller fills the application form (FIG. 7), where he has to provide name of goods or service, which he want to sell.

The seller has to specify a name of the goods or service in accordance with the tree of the Global Classification of Branches of Economy, Goods and Services (GC). He can type the name of the offered goods or service in the field of the name. If there is such name of the goods or service in the Global Classification, then the code of the goods or service will appear in the field of the Global Classification of Branches of Economy, Goods and Services (GC). After a choice of the name of the goods or service in the field of "main characteristics of goods or service", the concrete name of "main characteristics of specified goods or service", which are available in the database of the Global Classification of Branches of Economy, Goods and Services (GC) for each goods and service, will appear. The seller indicates a price of goods or service. He can show the exact, an approximate, a sample price of goods or service or the initial price for future negotiations. He can refuse to declare any price. But in this case his goods or service will not participate in sorting on the basis of price. He can indicate a quantity of offered goods, if it is a one-time sale, or a production's or services capacity for a long time delivery, if he wishes so, or volume of offered services and so on. He can indicate quality standards of offered goods or service, an availability of International quality certificates and other quality certificates and main characteristics of goods or service. He can indicate a country of producer of goods.

The system of global electronic trade will suggest to choose a dimension of the data from the pop-up list and will define a format of the data, at entering of the data in the field of the data "the quantity of offered goods or volume of service" and "price of offered goods or service" of the application form. The system of global electronic trade will suggest to choose names of local or international quality standards from the pop-up list, at entering of the data in the field of the data "quality standards of offered goods or service" of the application form. The system of global electronic trade will suggest to choose names of corresponding parameters, dimension of the data from the pop-up list and will define a format of the data, at entering of the data in the field of the data "main characteristics of goods or service" of the application form. The system of global electronic trade will suggest to choose the name of the country from the pop-up list, at entering of the data in the field of the data "the country of location of producer" of the application form. Thus, the system of global electronic trade will define names, codes, dimension and the format of the abovementioned data. The seller can also give any additional information about offered goods or service, for example, special technical characteristics, delivery terms, photos of goods and so on. If the seller wants, that the data of his offer have been placed in the database of the information about proposed goods and services and that buyers could find them, he will press the corresponding button on the application form. Thus, the seller insert in the application form following data: a name of goods or service and a code of goods or service in conformity with Global Classification of Branches of Economy, Goods and Services, a price of offered goods or service, a quantity of offered goods or volume of offered service, quality standards of offered goods or service, main characteristics of offered goods or service, a country of location of producer, an additional information about goods or service.

Names and numerical values or codes of the specified above data will be recorded in corresponding places of the database of the information about proposed goods and services. For example in case of the relational database the data about offer of the seller will occupy one row of the database. Numerical values or codes of the specified above data will be recorded in corresponding columns of the database. Thus, the system of global electronic trade in the Internet records in the database of structured information about proposed goods or service following data: the name of goods or service and the code of goods or service in conformity with Global Classification of Branches of Economy, Goods and Services, the price of offered goods or service, the quantity of offered goods or volume of offered service, quality standards of offered goods or service, main characteristics of offered goods or service, the country of location of producer, the additional information about goods or service.

Besides in a database about proposed goods and services the information with the data about the seller will be placed from the database of information about legal entities: a name of legal entity of the seller, a country of location of the seller. As a result the database of the information about proposed goods and services will represent the structured database. A basis of structurization of the database of the information about proposed goods and services is the Global Classification of Branches of Economy, Goods and Services (GC). The search by buyers of needed goods or services from the database of the information about proposed goods and services will be carried out on the basis of codes of the GC. Other data in the database of information about proposed goods and services also is structured as they have the strictly certain place in the database and have the strictly certain format of the data. They will be used for selecting of the needed data from the results of search. If the seller does not fill any data in the application form, this data cannot participate in selecting. Upon completion of filling of the application form by seller the offer is stored in the database of information about proposed goods and services and buyers will be able to access it immediately.

Requests of buyers and offers of sellers with GC codes of goods or service are placed to the databases on the host server. In result on the basis of requests of buyers the database of information about requests of buyers (5.3) is formed. On the basis of offers of sellers the database of information about proposed goods and services is formed (5.4). These databases are structured identically for aims of the automated search according to Global Classification of Branches of Economy, Goods and Services (GC).

Buyer or seller can modify their requests and offers through filling a special form.

Figure 8:
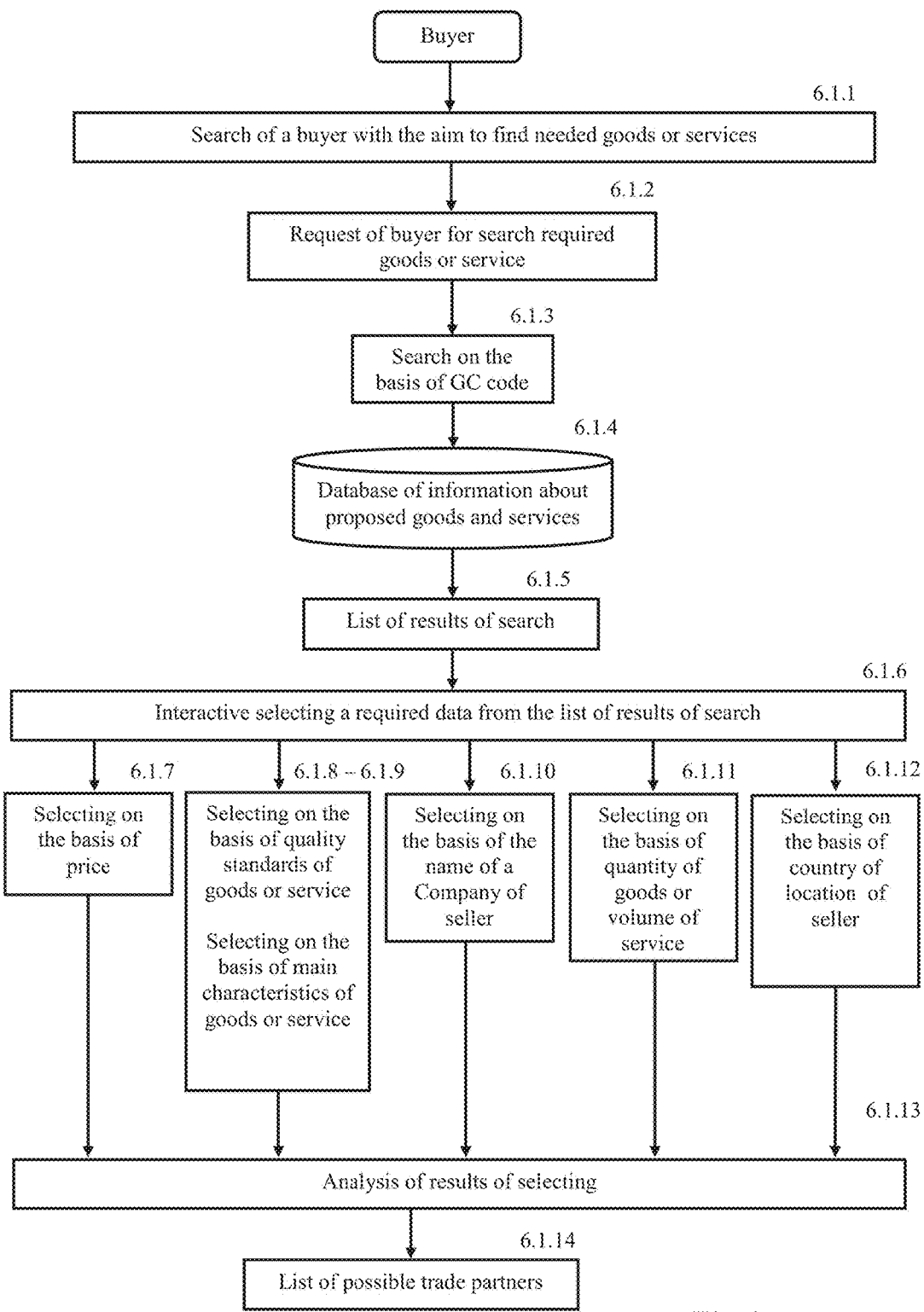
FIG. 8 is a flowchart showing the process of a search by a buyer with the aim to find needed goods or services with interactive selecting.
Figure 11:
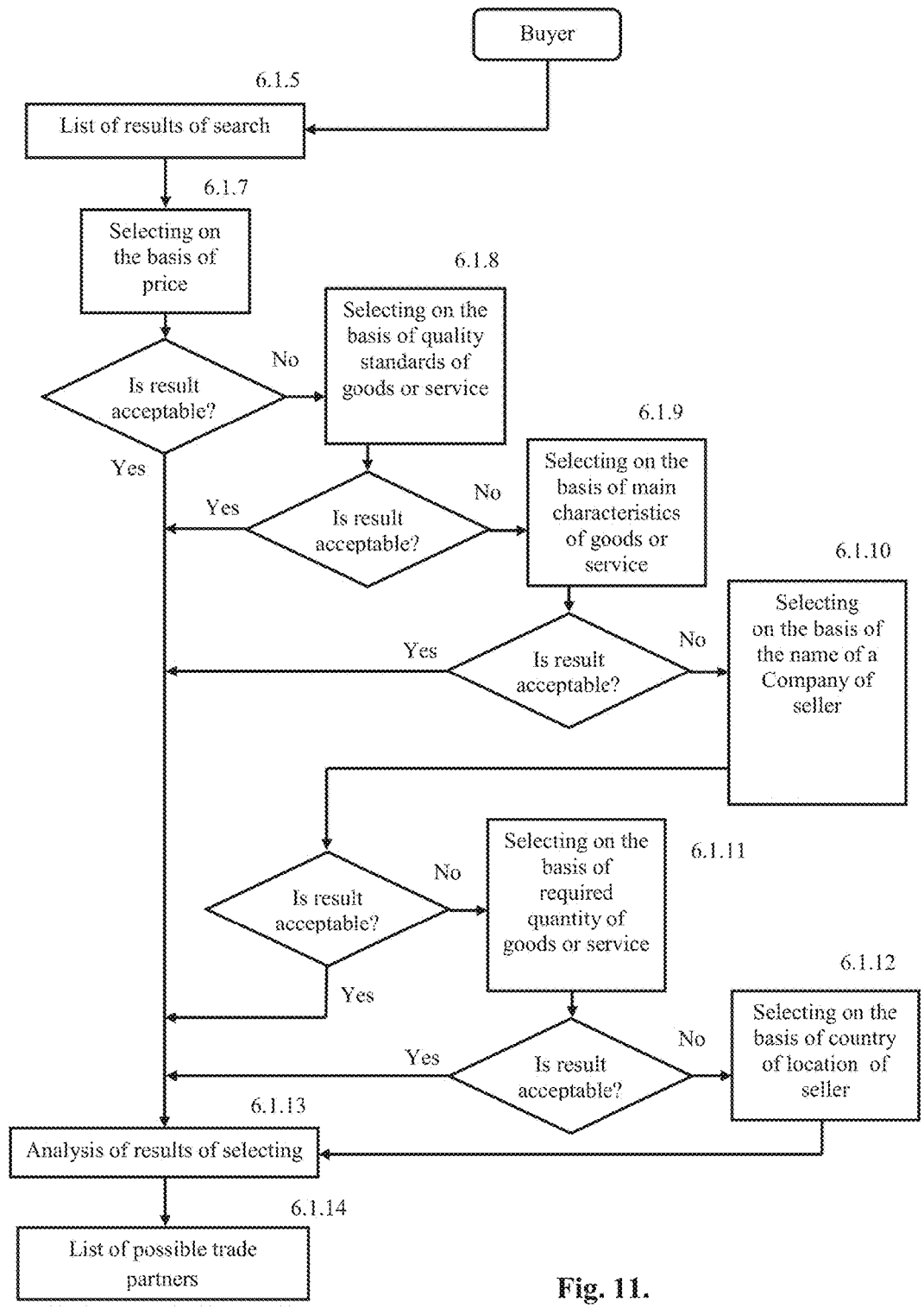
FIG. 11 is a flowchart showing algorithm of interactive selecting by a buyer.

Search and selecting of trade partners is one of the most important parts of the wholesale trade between companies. FIG. 8 shows how a buyer can perform a searching to find needed goods or services (6.1.1). The buyer must prepare the request for search of a required goods or service (6.1.2, FIG. 8), (FIG. 9).

The buyer specifies in this form a name of the goods or service which he wishes to find, in conformity with the Global Classification of Branches of Economy, Goods and Services (GC). The buyer can specify only the name of the needed goods or service according to Global Classification of Branches of Economy, Goods and Services (GC). The program of search of the needed goods or service will be switched on, after the buyer will send request to performance. Searching is conducted on the basis of codes of the Global Classification of Branches of Economy, Goods and Services (GC) (6.1.3). Searching is conducted in the database of the information about proposed goods and services (6.1.4), the information in which is structured on a basis the Global Classification of Branches of Economy, Goods and Services (GC).

The name of the goods or the service, specified by the buyer, completely will coincide with the name of the goods or the service, offered by the seller. The search program will find all records with the required goods or service in the database of the information about proposed goods and services. That is, as a result of the search, the system of global electronic trade will find all sellers of the specified goods or service, the information about which is recorded in the database of the system. Therefore, the search of trade partners by buyers in the database of structured information about proposed goods and services, which is carried out by the system of global electronic trade in the Internet, is uniquely defined.

As a result of the search, the system of global electronic trade will create a list of results of search (6.1.5), which has the same structure, as the database of the information about proposed goods and services, and which is cached on the server side.

The buyer can look through the list of results of the search, which will be sent to him from the server of the system of global electronic trade. If the list of trading partners appears small, the buyer can look through it all. If the result of search satisfies the buyer, he can finish the search, carry out the analysis of results of search and receive the list of possible trade partners (6.1.14).

The list of results of search will include: a name of goods or service, a price of goods or service, quality standards of goods or service, main characteristics of goods or service, a name of a legal entity of seller, needed quantity of goods or volume of service, a country of location of the seller, an additional information about goods or service, including a special technical characteristics, delivery terms and so on.

The buyer can carry out a sorting of data from the list of results of search. The buyer has to choose a criterion of sorting from list of criterions, which includes: a price of goods or service, quality standards of goods or service, main characteristics of goods or service, names of legal entities of sellers, a quantity of goods or a volume of service, a country of location of seller. Then the system of the global electronic trade in the Internet fulfills the sorting of data from the list of results of search in accordance with the chosen criterion of sorting. The list of results of search will be transformed as a result of the sorting. The list of results of search won't change its size.

If the chosen criterion of sorting is the price of goods or service, data will be placed in the list of results of search in the order of increasing of the price. If the chosen criterion of sorting is the quality standards of goods or service, data will be placed in the list of results of search according to numbers of the quality standards. If the chosen criterion of sorting is one of the main characteristic of goods or service, data will be placed in the list of results of search according to numeric value of this main characteristic of goods or service in the order of increasing of this value. If the chosen criterion of sorting is names of legal entities of sellers, data will be placed in the list of results of search according to names of legal entities of sellers in alphabetic order. If the chosen criterion of sorting is the quantity of goods or the volume of service, data will be placed in the list of results of search according to the quantity of goods or the volume of service, proposed by sellers, in the order of increasing of the quantity of goods or the volume of service. If the chosen criterion of sorting is country of location of seller, data will be placed in the list of results of search according to name of countries of location of sellers in alphabetic order.

It is supposed that the big number of sellers and buyers will be users of the system of global electronic trade. In this case the user can receive as a result of the request the list with very big number of potential trade partners. That is, the list of results of search can be very big. With the purpose to find the needed goods or service, the buyer can execute a selecting of data from the received list of results of search (6.1.5) (FIG. 8, 11).

Possibility of a fulfillment of the selecting of data is provided by presence in the database of the structured information about proposed goods and services. All data in the database have the strictly certain place and the format. The system of global electronic trade offers for users an interactive and an automatic mode of selecting of data. In case of the interactive (dialogue) mode of the selecting of data, the buyer should choose a criterion for the selecting of data for a first step. The values, including into the list of results of search (FIG. 8, 11), can be used as criterion of the selecting of data:

a price of goods or service (6.1.7),
quality standards of goods or service (6.1.8),
main characteristics of goods or service (6.1.9),
a name of a legal entity of a seller (6.1.10),
a quantity of goods or a volume of service (6.1.11),
a country of location of a seller (6.1.12).

For example, if the buyer chooses as criterion for the first step of the selecting of data the desirable price of the goods or service (6.1.7, FIG. 8, 11) or a desirable range of the prices and makes active the selecting of data, the system of global electronic trade will make this selecting of data from the list of results of search. The system of global electronic trade will present to the buyer the list of possible trade partners, sellers of the goods or service, with the price, desirable for buyer, and in the same format as the list of results of search. If the result of selecting satisfies the user, he can finish the selecting and make analysis of results of selecting (6.1.13, FIG. 8, 11). If the result of selecting does not satisfy the user, he can choose any other criterion of the selecting of data, for example quality standards of goods or service (6.1.8, FIG. 8, 11), and to continue the selecting of data. The system of global electronic trade will execute the selecting of data on the basis of the chosen criterion from the list of results of selecting, received on the previous step of the selecting of data. If the result of selecting satisfies the user, he can finish the selecting and make analysis of results of selecting (6.1.13, FIG. 8, 11). If the result of second step selecting does not satisfy the user, he can choose again any other criterion of the selecting of data, for example one of the main characteristics of goods or service (6.1.9, FIG. 8, 11) and to continue the selecting of data. The system of global electronic trade will execute the selecting of data on the basis of the chosen criterion from the list of results of selecting, received on the previous step of the selecting of data. The user can execute the selecting of data in the interactive mode, using consistently all available criteria of the selecting of data or only a part of criteria of the selecting of data, at will of the user (6.1.7-6.1.12 FIG. 8, 11). As it seen from the described algorithm of the selecting of data, the list of results of search decreases in process of the fulfillment of steps of the selecting of data. The buyer can return to the initial list of results of search (6.1.5, FIG. 8, 11) and to repeat the selecting of data with other criteria of selecting or in other sequence of criteria of selection. After the analysis of results of selecting (6.1.13) the buyer can get a list of possible trade partners (6.1.14).

Figure 15:
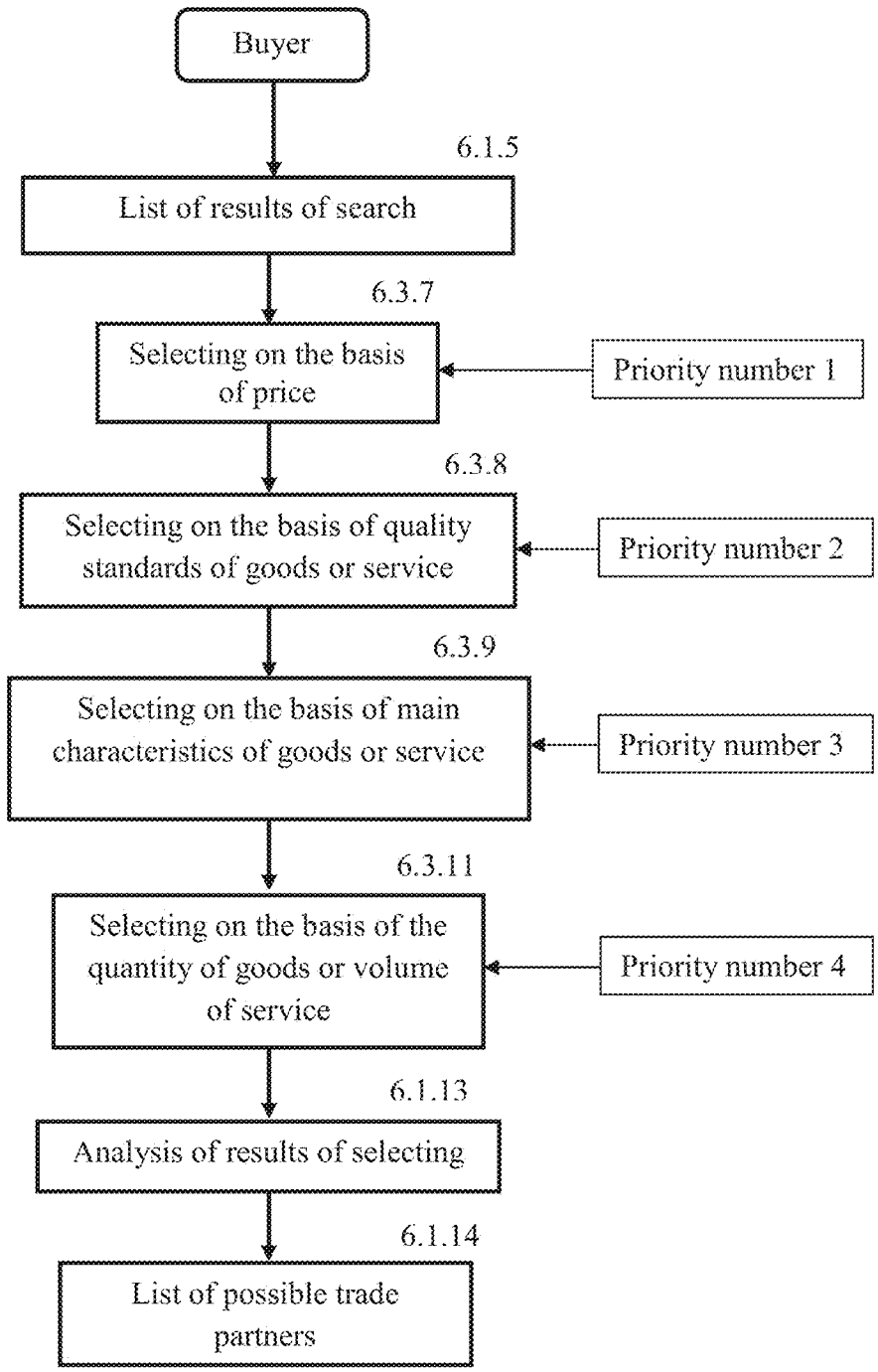
FIG. 15 is a flowchart showing algorithm of automatic selecting by a buyer.
Figure 16:
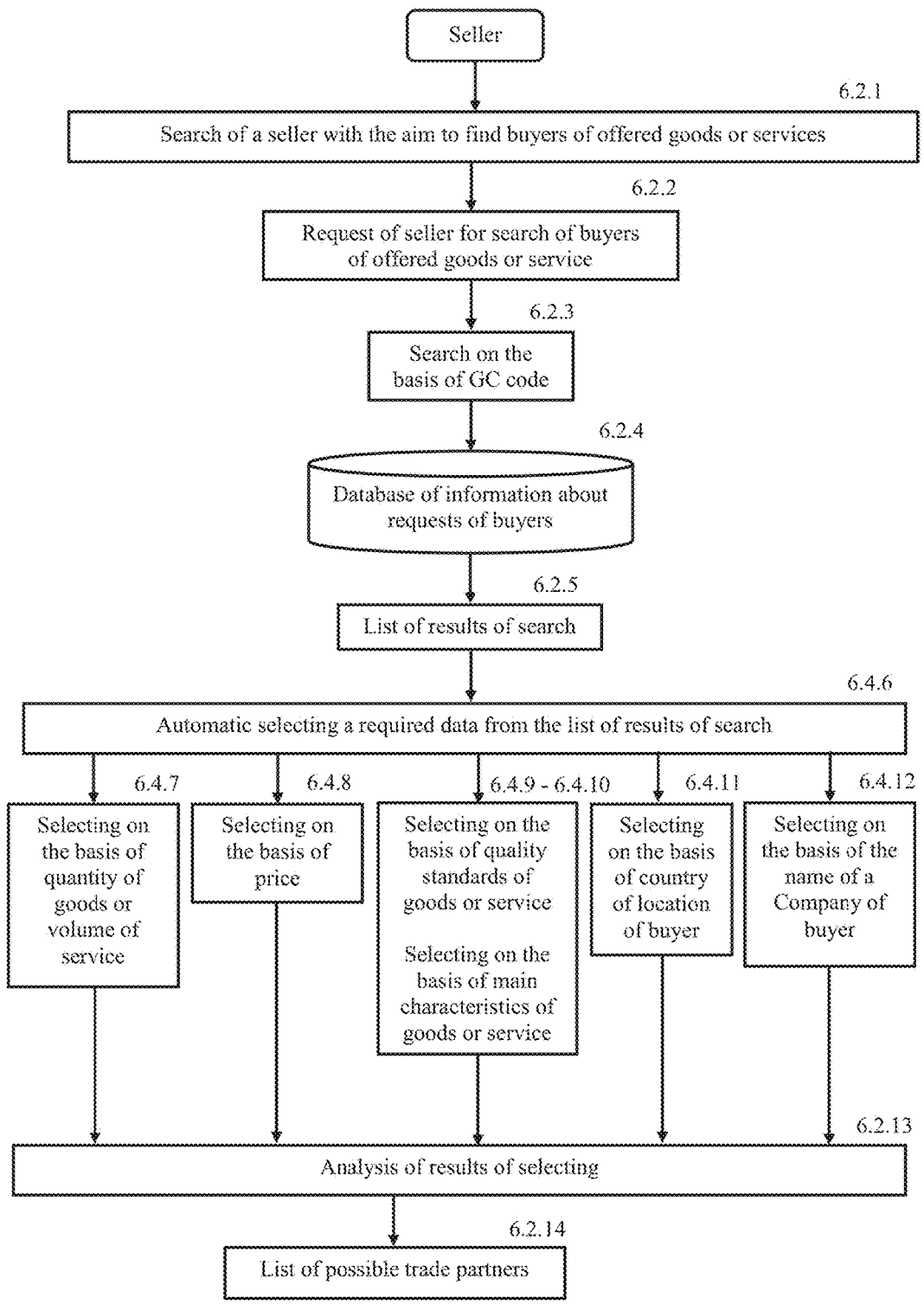
FIG. 16 is a flowchart showing the process of a search by a seller with the aim to find buyers of offered goods or services with automatic selecting.

In case of the automatic mode of the selecting of data, the buyer can make necessary selecting of data from the list of results of search in accordance with following algorithm. The buyer should choose criteria of the selecting of data and note them in the special form (FIG. 15). As criteria of the selecting of data he can choose (FIG. 14, 15): a price of goods or service (6.3.7), quality standards of goods or service (6.3.8), main characteristics of goods or service (6.3.9), a name of a legal entity of a seller (6.3.10), a quantity of goods or a volume of services (6.3.11), country of location of seller (6.3.12). The user can execute the selecting of data in the automatic mode using all available criteria of selecting or only a part of criteria of selecting at will. Besides, the buyer should define priorities of criteria of the selecting of data in the abovementioned form (FIG. 15). The selecting of data from the list of results of search (6.1.5 FIG. 14, 15) the system of global electronic trade will fulfill in conformity with these priorities. After activation of process of the selecting of data, the system of global electronic trade will make automatic selection. That is, in the beginning, the selecting of data with the criterion, having the first priority, will be made. Then the selecting of data from the received result with the criterion, having the second priority, will be made and so on to the last chosen criterion. After analysis of the results of this automatic selecting (6.1.13) the buyer can get a list of possible trade partners (6.1.14).

Figure 12:
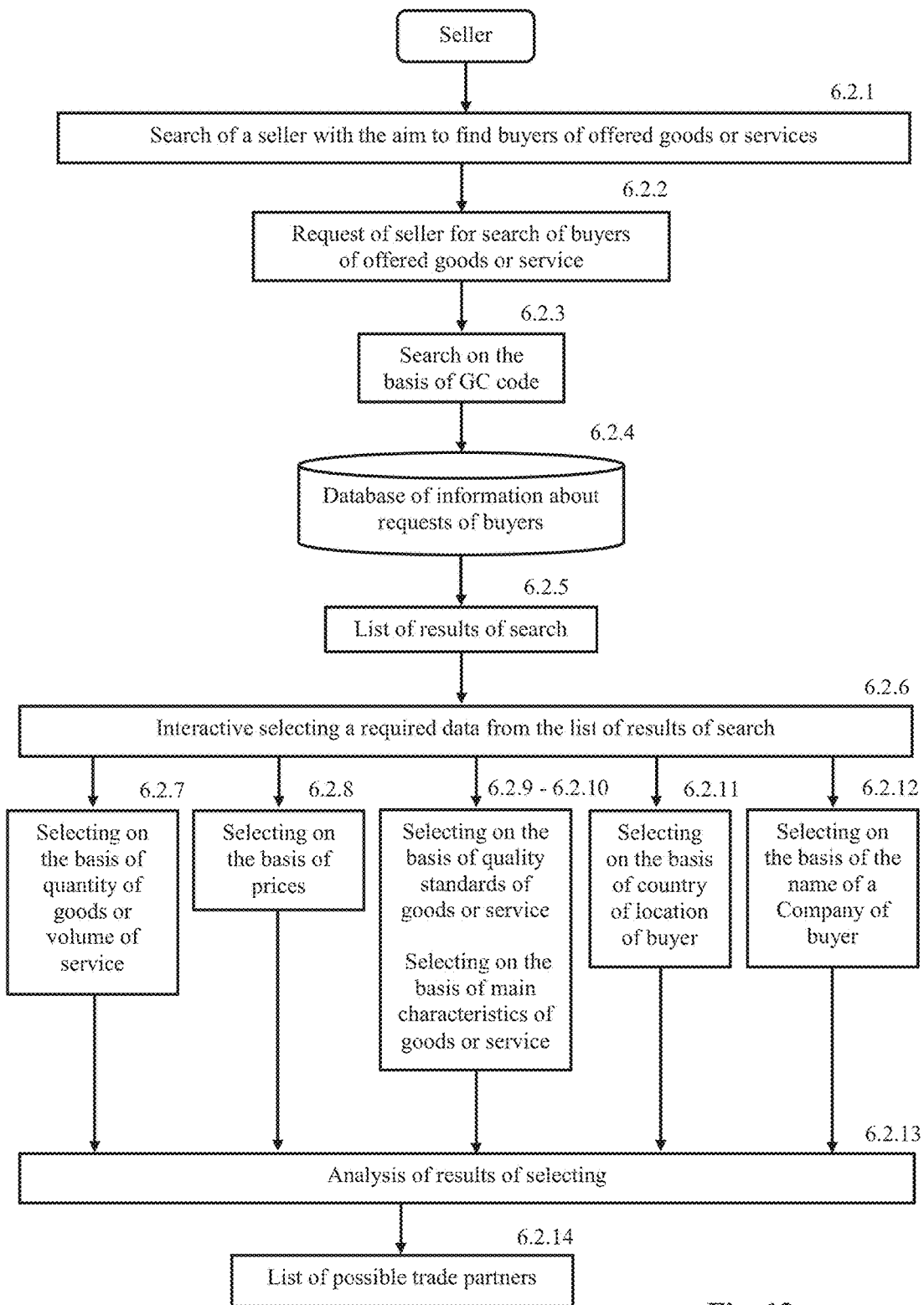
FIG. 12 is a flowchart showing the process of a search by a seller with the aim to find buyers of offered goods or services with interactive selecting.
Figure 13:
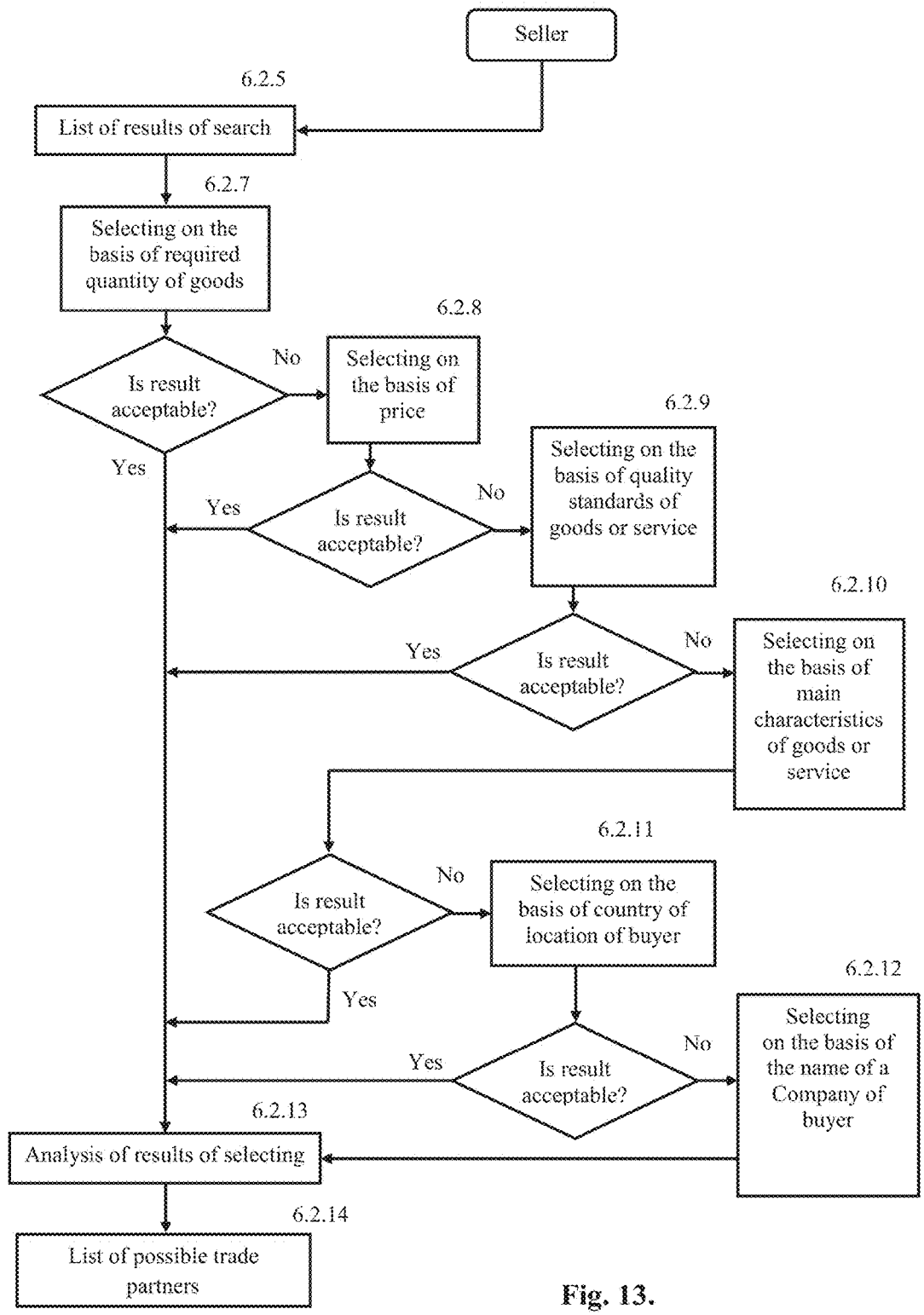
FIG. 13 is a flowchart showing algorithm of interactive selecting by a seller.
Figure 14:
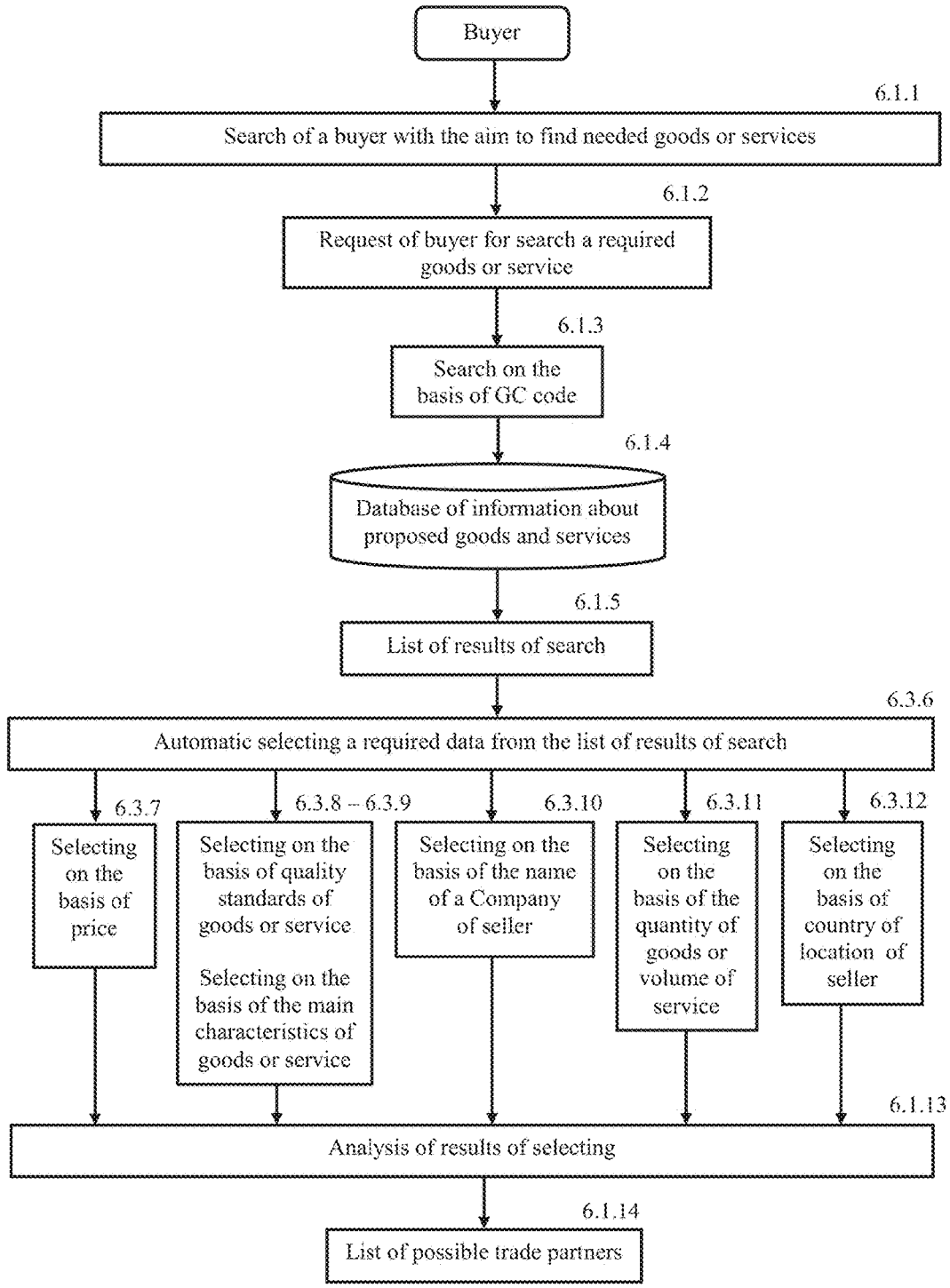
FIG. 14 is a flowchart showing the process of a search by a buyer with the aim to find needed goods or services with automatic selecting.

FIG. 12 shows a search of a seller with the aim to find potential buyers for offered goods or services (6.2.1). The seller must prepare the request for search of potential buyers for offered goods or services (6.2.2, FIG. 12) (FIG. 10).

The seller specifies in this form the name of the offered goods or service in conformity with the Global Classification of Branches of Economy, Goods and Services (GC). The seller can specify only the name of goods or service according to Global Classification of Branches of Economy, Goods and Services (GC). The program of the search of potential buyers of the offered goods or service will be switched on, after the user will send the request to performance. Searching is conducted on the basis of codes of the Global Classification of Branches of Economy, Goods and Services (GC) (6.2.3). Searching is conducted from the database of the information about requests of buyers (6.2.4), in the information, which is structured on the basis the Global Classification of Branches of Economy, Goods and Services (GC).

The name of the goods or service, offered by the seller, completely will coincide with the name of the goods or service, which is searched by the buyer. The program of search will find all records with the required goods or service in the database of the information about requests of buyers. That is, as the result of search, the system of global electronic trade will find all buyers of the specified goods or service, in the information, which is recorded in the database of the system. Therefore, the search of trade partners by sellers in the database of structured information about requests of buyers, which is carried out by the system of global electronic trade in the Internet, is uniquely defined.

As the result of search, the system of global electronic trade will create the list of results of search (6.2.5), which has the same structure, as a database of the information about requests of buyers, and which is cached on the server side.

The seller can look through the list of results of search, which will be sent to him from the server of the system of global electronic trade. If the list of trade partners appears small, the seller can look through it all. If the result of search satisfies the seller, he can finish the search, carry out the analysis of results of search (6.2.5) and receive the list of possible trading partners (6.2.14).

The seller gets a list of results of search, which includes: a name of goods or service, a quantity of goods or volume of service, a price of goods or service, quality standards of goods or service, main characteristics of goods or service, a name of a legal entity of buyer, country of location of the buyer, an additional information about goods or service, including a desired special technical characteristics, desired delivery terms and so on.

The seller can carry out a sorting of data from the list of results of search. The seller has to choose a criterion of sorting from list of criterions, which includes: a quantity of goods or volume of service, a price of goods or service, quality standards of goods or service, main characteristics of goods or service, a country of location of buyer, names of legal entities of buyers. Then the system of the global electronic trade in the Internet fulfills the sorting of data from the list of results of search in accordance with the chosen criterion of sorting. The list of results of search will be transformed as a result of the sorting. The list of results of search won't change its size.

If the chosen criterion of sorting is the quantity of goods or the volume of service, data will be placed in the list of results of search according to the quantity of goods or the volume of service, desired by buyers, in the order of increasing of the quantity of goods or the volume of service. If the chosen criterion of sorting is the price of goods or service, data will be placed in the list of results of search in the order of increasing of the price. If the chosen criterion of sorting is the quality standards of goods or service, data will be placed in the list of results of search according to numbers of the quality standards. If the chosen criterion of sorting is one of the main characteristic of goods or service, data will be placed in the list of results of search according to numeric value of this main characteristic of goods or service in the order of increasing of this value. If the chosen criterion of sorting is country of location of buyer, data will be placed in the list of results of search according to name of countries of location of buyers in alphabetic order. If the chosen criterion of sorting is names of legal entities of buyers, data will be placed in the list of results of search according to names of legal entities of buyers in alphabetic order.

The list of results of search can be very big. With the purpose to find buyers of proposed goods or service, the seller can execute a selecting of data from the received list of results of search (6.2.5) (FIG. 12, 13). Possibility of a fulfillment of the selecting of data is provided by presence in the database of the structured information about requests of buyers. All data in the database have the strictly certain place and the format. In case of an interactive (dialogue) mode of the selecting of data, the seller should choose a criterion for the selecting of data for a first step. The values, including into the list of results of search (FIG. 12, 13), can be used as criterion of the selecting of data:

a quantity of goods or volume of service (6.2.7),
a price of goods or service (6.2.8),
quality standards of goods or service (6.2.9),
main characteristics of goods or service (6.2.10), a country of location of a buyer (6.2.11) and name of a legal entity of a buyer (6.2.12).

For example, if the seller chooses as criterion for the first step of the selecting of data the quantity of goods or volume of services (FIG. 13, 6.2.7) and makes active the selecting of data, the system of global electronic trade will make this selecting of data from the list of results of search. The system of global electronic trade will present to the seller the list of the companies or individual businessmen, sellers, in the same format as the list of results of search. If the result of selecting satisfies the user, he can finish the selecting and make the analysis of results of this step of the selecting (6.2.13, FIG. 12, 13). If the result of selecting does not satisfy the user, he can choose any other criterion of the selecting of data, for example the price of goods or service (6.2.8, FIG. 13), and to continue the selecting of data. The system of global electronic trade will execute the selecting of data on the basis of the chosen criterion from the list of results of selecting, received on the previous step of the selecting of data. If the result of selecting satisfies the user, he can finish the selecting and make the analysis of results of the selecting (6.2.13, FIG. 12, 13). If the result of the second step of selecting does not satisfy the user, he can choose again any other criterion of the selecting of data, for example quality standards of goods or service (6.2.9, FIG. 12, 13) and to continue the selecting of data. The system of global electronic trade will execute the selecting of data on the basis of the chosen criterion from the list of results of selecting, received on the previous step of the selecting of data. The user can execute the selecting of data in the interactive mode, using consistently all available criteria of the selecting of data or only a part of criteria of the selecting of data, at will of the user (6.2.7-6.2.12 FIG. 12, 13). As it seen from the described algorithm of the selecting of data, the list of results of search decreases in process of the fulfillment of steps of the selecting of data. The seller can return to the initial list of results of search (6.2.5, FIG. 12, 13) and to repeat the selecting of data with other criteria of selecting or in other sequence of criteria of selection. After the analysis of results of selecting (6.2.13) the buyer can get a list of possible trade partners (6.2.14).

Figure 17:
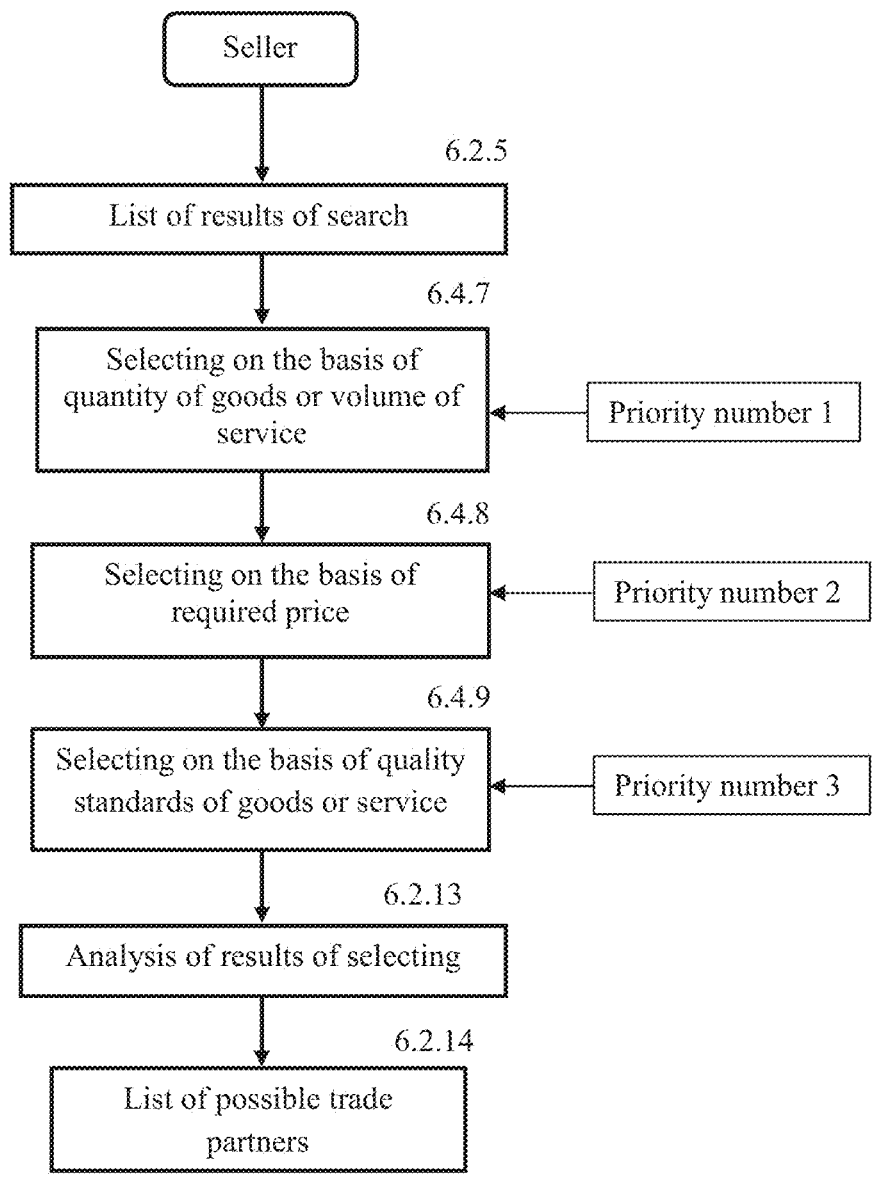
FIG. 17 is a flowchart showing algorithm of automatic selecting by a seller.

In case of an automatic mode of the selecting of data, the seller can make necessary selecting of data from the list of results of search in accordance with following algorithm. The seller should choose criteria of the selecting of data and note them in the special form (FIG. 17). As criteria of selecting he can choose (FIG. 16, 17): a quantity of goods or volume of service (6.4.7), a price of goods or service (6.4.8), quality standards of goods or service (6.4.9), main characteristics of goods or service (6.4.10), a country of location of a buyer (6.4.11) and a name of a legal entity of a buyer (6.4.12). The user can execute the selecting of data in the automatic mode using all available criteria of selecting or only a part of criteria of selecting at will. Besides, the seller should define priorities of criteria of the selecting of data in the abovementioned form (FIG. 17). The selecting of data from the list of results of search (6.2.5 FIG. 16, 17) the system of global electronic trade will fulfill in conformity with these priorities. After activation of process of the selecting of data, the system of global electronic trade will make automatic selection. That is, in the beginning, the selecting of data with the criterion, having the first priority, will be made. Then the selecting of data from the received result with the criterion, having the second priority, will be made and so on to the last chosen criterion. After analysis of the results of this automatic selecting (6.2.13) the seller can get a list of possible trade partners (6.2.14).

Figure 18:
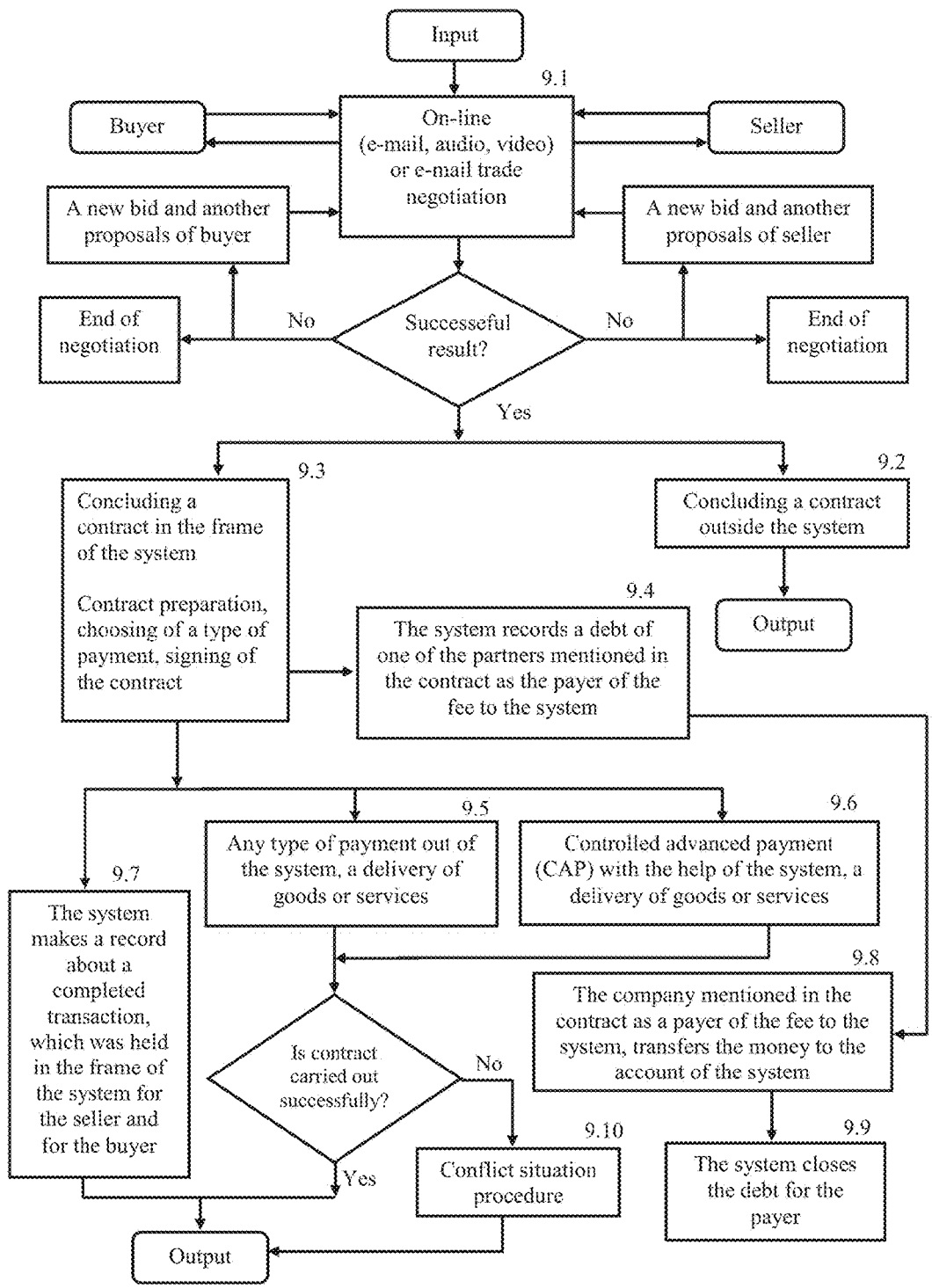
FIG. 18 is a flowchart showing a procedure of transaction.

FIG. 18 describes the transaction block. After definition of potential partners, sellers and buyers can engage into trade negotiations. They can do this negotiation on-line, using provided audio or video services or internal e-mail. Audio or video can be conducted through a special window in the site. Negotiations can be done as an exchange of text or e-mail messages, or via telephone (9.1). If the result of negotiations is successful, parties can prepare a contract. The contract can be concluded in the frame of the system (9.3) or outside the system (9.2). If the contract is concluded in the frame of the system, the system records a debt to one of the partners, who will be named in the contract as the payer of a fee to the system (9.4). Partners can choose a type of payment during concluding the contract. It can include any type of payment outside the system (9.5) and the Controlled Advanced Payment (CAP) with the help of the system (9.6). After concluding the contract, the system makes a record about the contract, concluded in the frame of the system, for the seller as well as for the buyer (9.7). This record will be entered into the database of the companies, where the total number of contracts, concluded in the frame of the system, is shown. Before the date mentioned in the contract the party, named in the contract as the payer of the fee to the system, transfers the money to the system (9.8). After that the system closes the debt to this company (9.9). If the contract is carried out successfully, then the transaction process is finished. Otherwise the procedure of conflict situation (FIG. 21) will be initiated (9.10).

Figure 19:
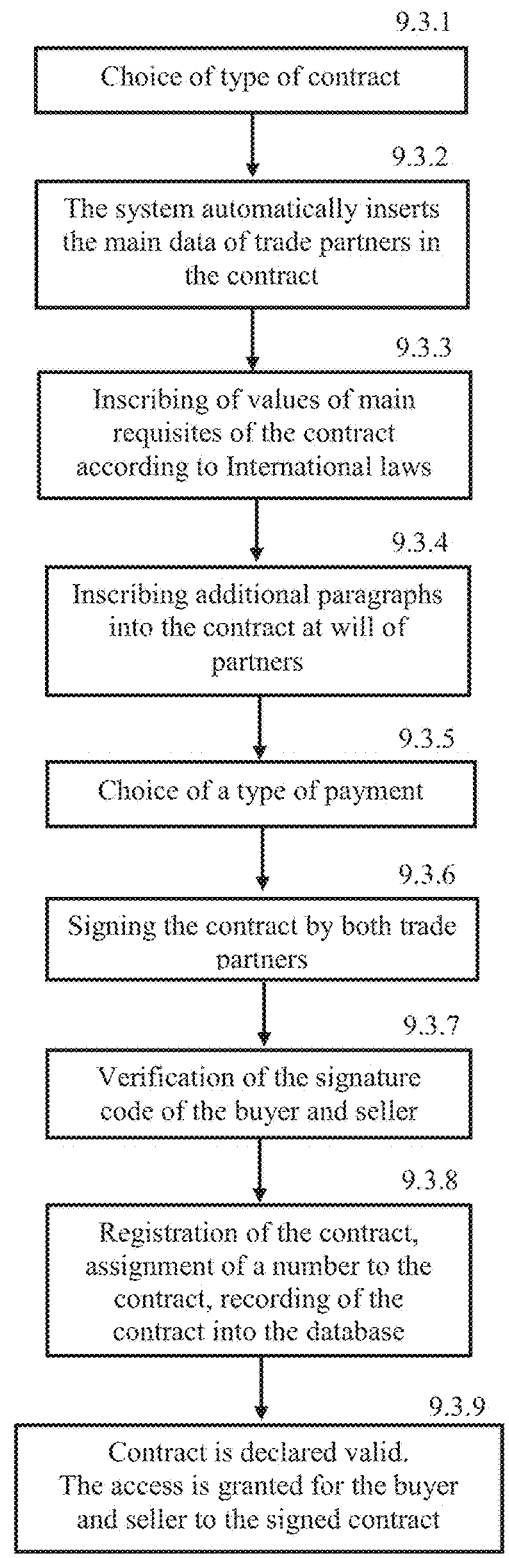
FIG. 19 is a flowchart showing the process of concluding of contracts.

FIG. 19 describes a process of preparing and concluding the contract. The trade partners are able to choose a suitable type of the standard contract, which is proposed by the system of global electronic trade for conclusion of an agreement of purchase and sale (9.3.1). The standard contract contains samples of formulations of the main requisites of the contract according to the International legal regulations. The standard contracts will help to users of the system of global electronic trade at preparation of a text of the contract. The system of global electronic trade proposes different types of standard forms of contracts depending on: a type of parties as juridical persons, a subject of the agreement, a time of duration of trading relation between a seller and a buyer, a method of payment and so on. After the trade partners will define the type of the standard contract, the system automatically inserts the main data about the trade partners in the contract (9.3.2) from the database of confidential information about legal entities. Then the partners inscribe values of main requisites according to the International laws in the contract (9.3.3). The main requisites can include: a name of goods or services, a quantity of sold goods or services and so on. The contract won't be registered in the system until these data is not inscribed. After that the partners can introduce additional paragraphs into the contract if they wish so (9.3.4). The partners define the type of payment (9.3.5). Then the partners have to decide who will pay the fee to the system, and mention this company in the contract. The partners have to specify the date of delivery of goods or the fulfillment of services and the payment date. After that the partners insert electronic signatures into the contract through entering corresponding codes in the special fields (9.3.6). The partner having a seal according to the article of association must set the electronic seal in the determined place. After that the system verifies the introduced signatures and seal codes (9.3.7). If all the data is valid, the system sets scanned signatures and seals of each party in the determined places in the contract. After that the system registers the contract, assigns a number to the contract and records the contract into the database of confidential information about legal entities (9.3.8) without a possibility to insert any one-sided changes in the contract. After the contract registration is declared valid, an access to the contract is granted to both parties (9.3.9) in order to be able to print it, to store in another location and so on.

The contract will be registered only in case signed by both parties, so no party can declare, that the contract was not signed. This procedure increases the reliability of the contract.

After the registration of the contract, the automatic record of information about the contract, concluded in the frame of the system of global electronic trade, for every participant of transaction in the database of open information about legal entities, will be done.

The contract can be modified on mutual assent of parties by means of filling of a special form with electronic signatures in case of necessity.

The contract can be canceled on mutual assent of parties by means of filling of a special form with electronic signatures in case of necessity.

Figure 20:
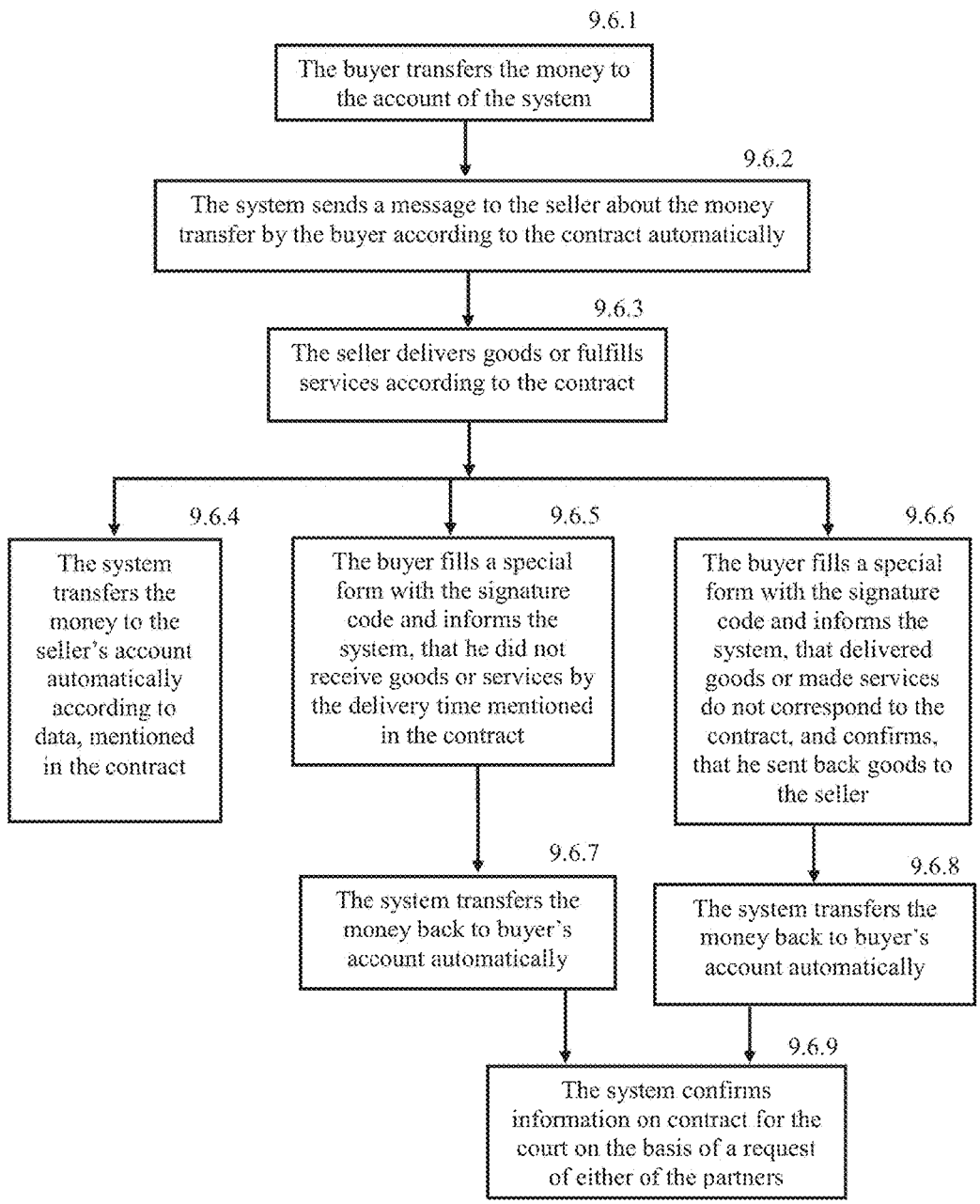
FIG. 20 is a flowchart showing a detailed description of the Controlled Advanced Payment.

FIG. 20 describes the Controlled Advanced Payment (CAP). The Controlled Advanced Payment (CAP) is intended for fulfillment of a payment for the goods or services in case of concluding of a contract in the frame of the system of global electronic trade in the Internet. It is intended to raise reliability of contracts, concluded within the frame of the system of global electronic trade in the Internet. A buyer transfers money to an account of the system of global electronic trade in the Internet (9.6.1). Then the system sends a message to a seller about the money transfer from the buyer (9.6.2) automatically. After that, the seller must deliver goods or make services according to the contract (9.6.3). If everything is normal, the buyer sends no messages to the system, the system automatically transfers the money to an account of the seller, according to terms specified in the contract (9.6.4). If the buyer does not get goods or services by a delivery time, specified in the contract, then the buyer has to fill a special form with his electronic signature (9.6.5). The buyer informs the system, what he did not get goods or services by the delivery time, specified in the contract. After receiving this message the system transfers the money back to an account of the buyer (9.6.7) automatically. In case delivered goods or fulfilled services did not correspond to the contract, then buyer fills a corresponding form with his electronic signature (9.6.6). The buyer informs the system, what delivered goods or fulfilled services did not correspond to the contract, and confirms, what he has sent back goods to the seller or did not take over the services. After that the system transfers the money back to the buyer's account (9.6.8) automatically. The system of global electronic trade can give the information about the contract and other official documents of the system to court in case of an impleading of one of the parties (9.6.9).

Figure 21:
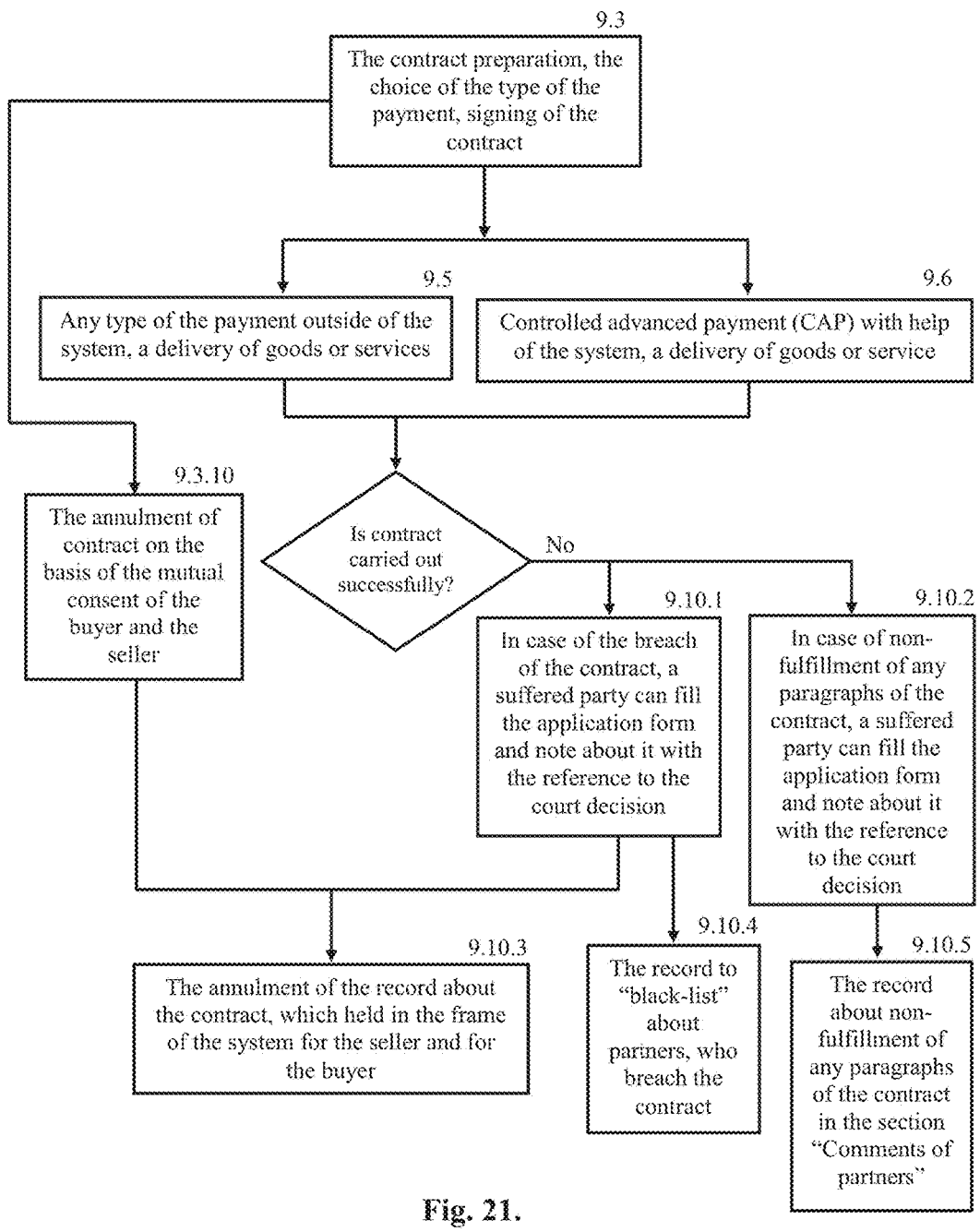
FIG. 21 is a flowchart showing the procedure of solving conflicts and annulment of contracts.

FIG. 21 describes the procedure of solving a conflict situation and a situation of an annulment of the contract. The both parties can make changes in the contract by means of a special form. If the both parties decide to cancel the contract, they must fill also a special application form and both sign it (9.3.10). After signing this application form by both parties, the contract will be cancelled. Certainly, the record about the contract fulfilled in the frame of the system will be also cancelled (9.10.3) automatically.

In case of a breach of the contract by any party, an offended party can fill a special application form with an electronic signature and provide a reference on a court decision (9.10.1). Then, a new record appears in the "black-list" containing information on all trade partners, breaching their contracts (9.10.4), automatically. The annulment of the previously made record about this contract in the list of contracts of the seller and the buyer (9.10.3) occurs automatically. In case of a non-fulfillment of any paragraphs of the contract by one party, the offended party can fill a special application form with an electronic signature and provide a reference on the court decision (9.10.2). After that, a record about non-fulfillment of any paragraphs of the contract by this party in section "Comments of partners" of the system of global electronic trade in the Internet (9.10.5) appears automatically. Sections the "Comments of partners" and the "black-list" are accessible for all the users.

Figure 22:
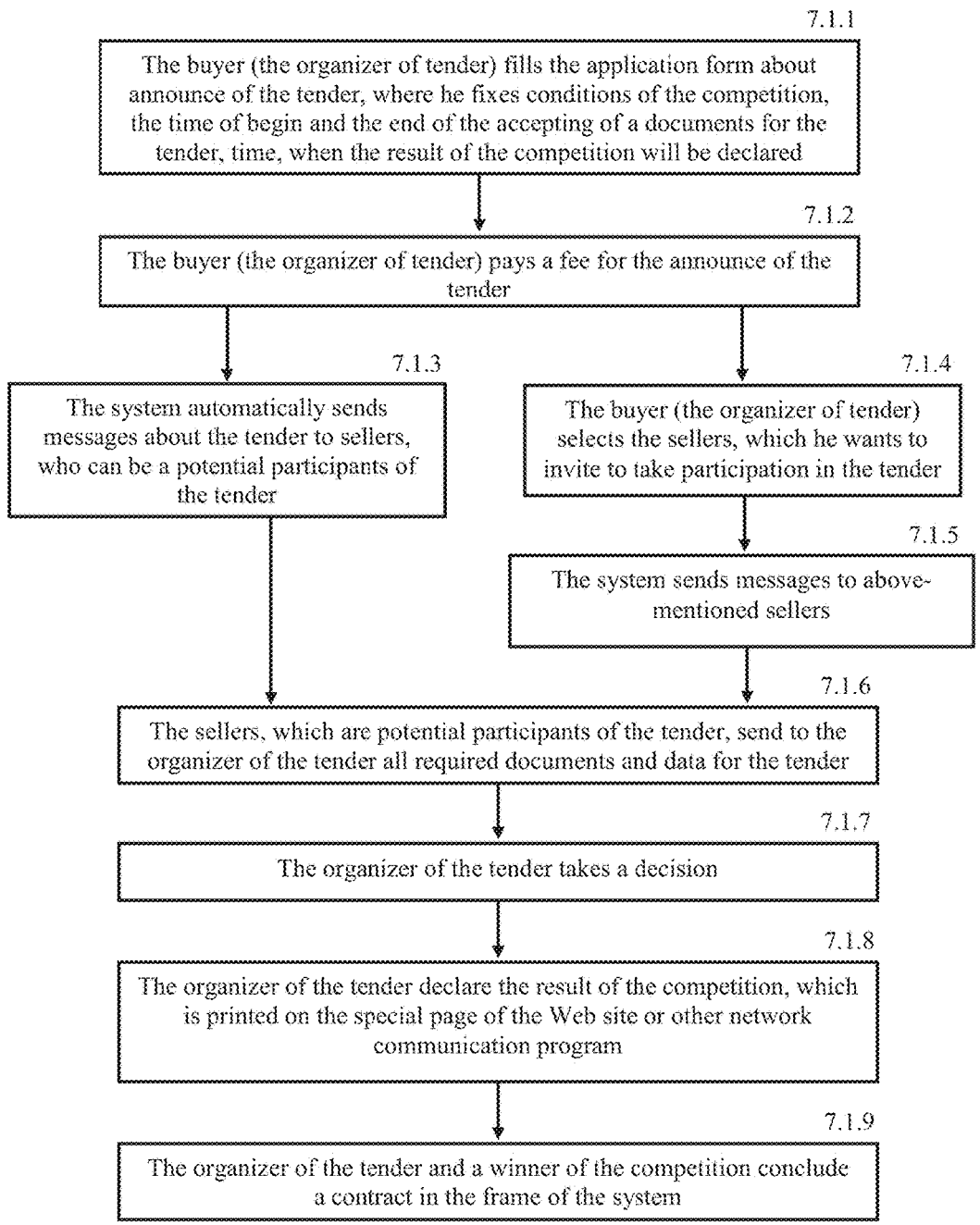
FIG. 22 is a flowchart showing the process of holding tender by a buyer.

FIG. 22 describes the procedure of holding tenders by buyers. Under the tender, which is held by the buyer, is understood a competition, which the buyer holds among sellers of the goods or services, which the buyer wishes to buy. The tender is carried out within the frame of the system of global electronic trade in the Internet. The purpose of tender is to accelerate and to increase efficiency of process of purchase of the required goods or services and to raise reliability of the transaction. A buyer (the organizer of the tender) fills the application form about announcement of the tender, where he determines parameters of the competition, namely: a name of goods or service, which the buyer want to buy, and a code of goods or service in conformity with Global Classification of Branches of Economy, Goods and Services, a quantity of goods or a volume of service, quality standards of goods or service, main characteristics of goods or service, a desired price of goods or service; the time frame for accepting the documents for the tender; the time when the result of the tender will be declared (7.1.1). Then the buyer (the organizer of the tender) pays the fee to the system of global electronic trade for the announcement of the tender (7.1.2). Searching of potential participants of the tender is carry out by the system of the global electronic trade in the database of the structured information about proposed goods and services on the basis of the name and code of required goods or service, according to the Global Classification of Branches of Economy, Goods and Services, which the buyer has inserted in application form as the parameters of the tender (the competition). The system of the global electronic trade creates a list of results of search of potential participants of the tender in result of the search. The automatic selecting of data is carried out from the list of results of search of potential participants of the tender in accordance with automatic mode of selecting. The system of the global electronic trade creates a list of results of selecting of potential participants of the tender in result of the selecting. There are two ways for notifying potential participants about the tender. In the first way the system automatically sends messages about the tender to potential participants on the basis of the list of results of selecting of potential participants of the tender (7.1.3). In the second way, the buyer (the organizer of tender) selects the sellers, which he wants to invite to take participation in the tender (7.1.4). Then the system sends messages to above-mentioned sellers by internal e-mail (7.1.5). The participants of the tender send all the needed data and documents for the tender to the organizer of the tender (7.1.6). After having analyzed these data the organizer of the tender takes a decision (7.1.7). Then the organizer declares the result of the tender, which is published on the special page of the Web site (7.1.8), what are available for participants of competition only. Finally, the organizer of the tender and a winner of the competition conclude the contract in the frame of the system of global electronic trade in the Internet (7.1.9).

Figure 23:
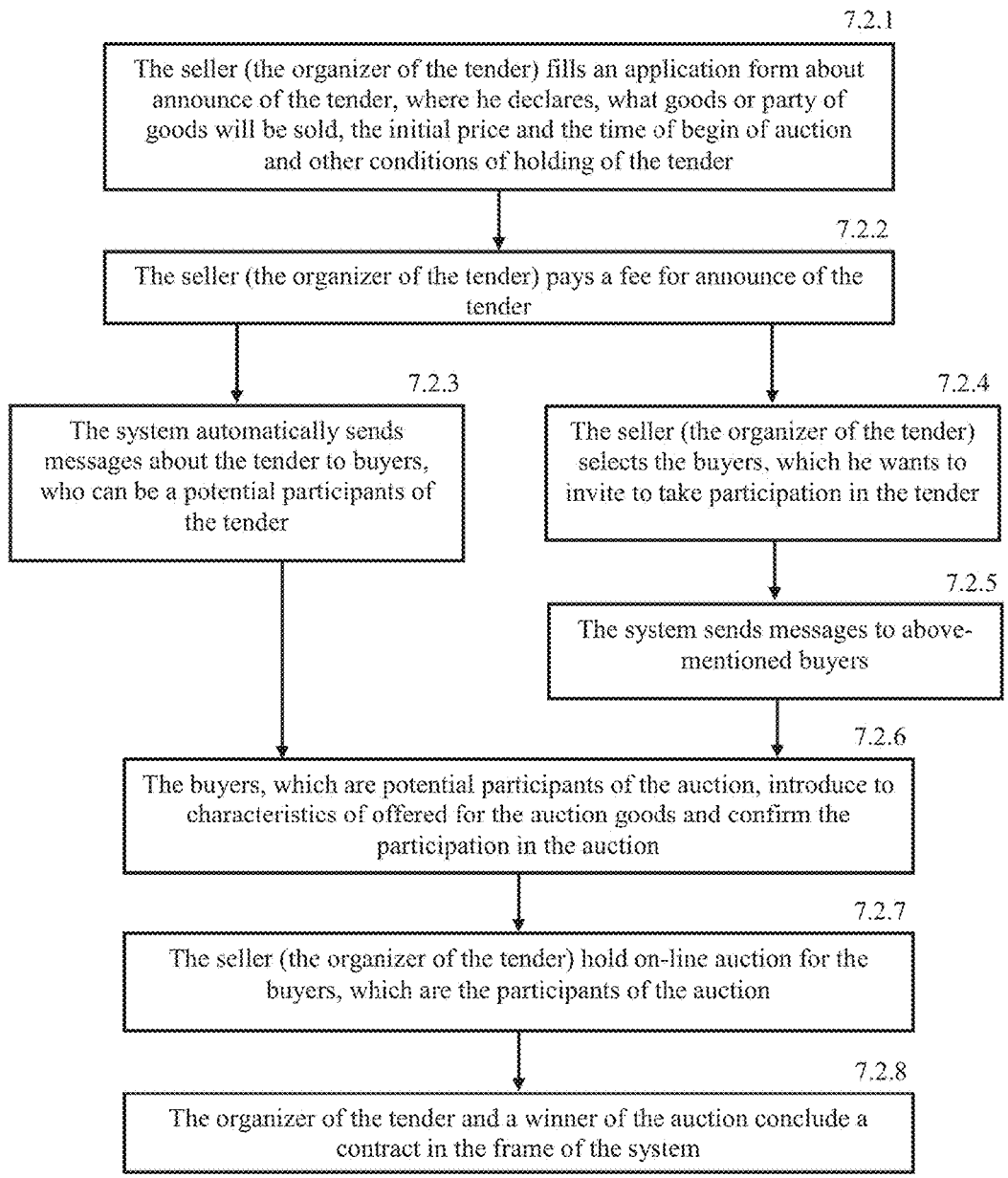
FIG. 23 is a flowchart showing the process of holding tender by a seller.

FIG. 23 describes the procedure of holding a tender by sellers. Under the tender which is held by the seller, is understood a bidding (or auction), which the seller bids in order to sell the goods or services. The tender is carried out within the frame of the system of global electronic trade in the Internet. The purpose of tender is to accelerate and to increase efficiency of process of sale of the goods offered by the seller and to raise reliability of the transaction. A seller (the organizer of the tender) fills the application form for announcement of the tender, where he declares, which goods or party of goods will be sold, codes of proposed goods, according to the Global Classification of Branches of Economy, Goods and Services, the initial price and the time frame of an auction and other parameters for holding the tender (7.2.1). Then the seller, as the organizer of the tender, pays the fee to the system of global electronic trade for the announcement of the tender (7.2.2). Searching of potential participants of the tender is carry out by the system of the global electronic trade in a database of the structured information about requests of buyers on the basis of the names and codes of proposed goods, according to the Global Classification of Branches of Economy, Goods and Services, which the seller has inserted in application form for announcement of the tender. The system of the global electronic trade creates a list of results of search of potential participants of the tender in result of the search. The automatic selecting of data is carried out from the list of results of search of potential participants of the tender in accordance with automatic mode of selecting. The system of the global electronic trade creates a list of results of selecting of potential participants of the tender in result of the selecting. Notification about the tender is sent like in the previous case (7.2.3, 7.2.4, 7.2.5). The buyers, as potential participants of the auction, get familiar with characteristics of the offered goods and confirm their participation in the auction (7.2.6). After that, the organizer of the tender holds the on-line auction for the participants of the auction (7.2.7). Finally, the organizer and a winner of the tender conclude the contract in the frame of the system of global electronic trade in the Internet (7.2.8).

Figure 24:
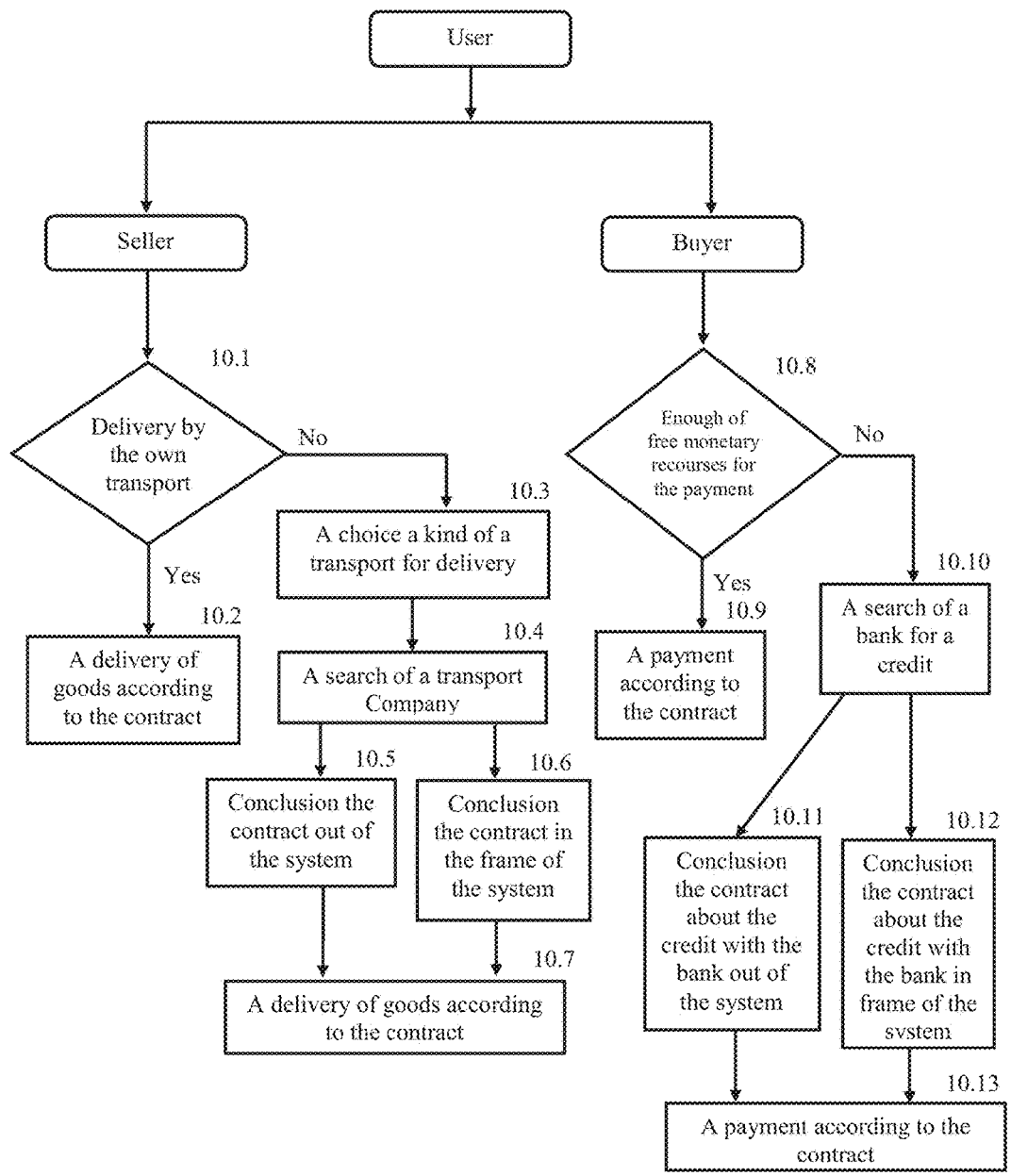
FIG. 24 is a flowchart showing a post-transaction process.

FIG. 24 describes the post-transaction procedure. The post-transaction procedure includes delivery of goods by seller (10.1-10.7) and payment for goods or services by buyer (10.8-10.13). A seller must estimate his possibilities to deliver in fixed terms his goods (10.1). If the seller does not have own any transport, he can choose a transport company (10.3, 10.4). A buyer must estimate his free monetary recourses available for the payment (10.8). If the buyer does not have enough free monetary recourses to make payment, he must conclude a credit agreement (10.10).

FIG. 25 describes additional services of the system of global electronic trade (FIG. 25, 8). These services include:
a detailed help for working in the system of global electronic trade in the Internet with a number of examples (8.1),
a juridical services dealing with problems of electronic trade (8.2),
an analysis and prognosis of the market, if required to companies, to other organizations and individuals (8.3),
an insurance of cargoes (8.4),
an insurance of payments and so on (8.4),
an analysis of the global market (8.5),
analysis of a market of some goods and services (8.5),
a publication of a magazine with an analysis of the global electronic trade (8.5), and
"Hot-line" with consultation about the work of the system of global electronic trade in the Internet (8.6).

FIG. 26 describes the procedure of protecting of information in the system of global electronic trade in the Internet. The code generator (password generator) must be executed before entering in the system of global electronic trade. The code generator starts by means of the user password for entrance into the system of global electronic trade in the Internet (12.1). The code generator reads a previously generated password, stored on the hard drive of the user's computer (12.2), the current date and time of a beginning of the generation process of the new password (12.3), the IP address of the user's computer (12.4) and verifies the Internet connection (12.8). If the connection is missing, then the generator exits without any further action.

If the connection is valid, the code generator (12.5) makes a new password (12.9) and sends it to the host server together with the exact time, when the new password was generated. The code generator of the security database on the host server (12.6) generates a new verification password (12.10) on the basis of the acquired time, the incoming IP address (12.4) and the previous successful user's password, stored in the security database on the host server (12.7).

The host server compares the sent new password with the verification password (12.11). If these codes match the user immediately gets an access to the system of global electronic trade (12.14). The created passwords replace the previously stored passwords on the user's computer and a security database of host server (12.12). The date and time of generation of the password is stored in the security database (12.12) also. Otherwise, if any data mismatch the user's domain is blocked (12.13) and any corresponding information in the security database is deleted, so that no one can login from the registered IP-address anymore. In the case of successful connection, user gets the time of previous connection with the system of electronic trade (12.15).

The storage of the date and time of the previously connection can help for user to discover unsanctioned enter to the system of global electronic trade in the Internet from the user's computer also.

The system and method of global electronic trade in the Internet can be realized and for local territory: groups of the countries, the separate country or region.

The system and method of global electronic trade in the Internet can be realized and for trade by separate groups of goods and services, for example for trade by foods, for trade by cars and so on.

What is claimed is:

1. A method of operating of a system of global electronic trade in the Internet, wherein the system of global electronic trade in the Internet possesses by a combination of properties:
   (1) the system of global electronic trade in the Internet comprises a host server, including a Web site or other network communication program with multi-language support;
   (2) the host server of the system of global electronic trade in the Internet comprises: a database of a Global Classification of Branches of Economy, Goods and Services, a database of structured information about proposed goods and services, a database of structured information about requests of buyers, a database of confidential information about legal entities, a database of open information about legal entities, and a security database;
   (3) the host server of the system of global electronic trade in the Internet connects by means of the Internet with numerous computers of sellers, wherein the computers of sellers comprise password generators for entrance into the system of global electronic trade in the Internet, and wherein sellers communicate with the Web site and with databases of the host server of the system of global electronic trade in the Internet with help of a Web browser and with help of the Internet; and (4) the host server of the system of global electronic trade in the Internet connects by means of the Internet with numerous computers of buyers, wherein the computers of buyers comprise password generators for entrance into the system of global electronic trade in the Internet, and wherein buyers communicate with the Web site and with databases of the host server of the system of global electronic trade in the Internet with help of a Web browser and with help of the Internet; and wherein the method of operating of the system of global electronic trade in the Internet, wherein the system of global electronic trade in the Internet possesses by said combination of properties, comprises a combination of steps:

a) creating of the database of the Global Classification of Branches of Economy, Goods and Services, where the Global Classification of Branches of Economy, Goods and Services represents by itself a hierarchical tree with names and corresponding codes of divisions and subdivisions of branches of world Economy, and where terminal divisions and subdivisions of branches of world Economy comprise names and corresponding codes of goods and services, and where terminal divisions and subdivisions of branches of world Economy comprise main characteristics of goods and services, and wherein the database of the Global Classification of Branches of Economy, Goods and Services at least comprises:
  (1) names of goods and services and corresponding codes of goods and services according to the Global Classification of Branches of Economy, Goods and Services; and
  (2) main characteristics of goods and services, which comprise main technical characteristics of goods or services and basic performances of quality of goods or service;

b) registration of users: of sellers and buyers in the system of global electronic trade in the Internet, where the registration comprises at least a combination of steps:
  (1) filling a registration form by a user, where the registration form comprises data:
    a name of a legal entity;
    a state registration number of the legal entity;
    a date of registration of the legal entity by a state agency;
    a location address of the legal entity;
    a legal address of the legal entity;
    an e-mail address; and
    a telephone number of the legal entity;
  (2) inserting a name and a job position of an official representative of the legal entity, who can sign contracts and other official documents on a behalf of the legal entity, into the registration form;
  (3) inserting a scanned signature of the official representative of the legal entity into the registration form;
  (4) inserting a scanned seal into the registration form, if the legal entity has a seal;
  (5) creating of a user domain in a database of the system of global electronic trade in the Internet, where all data of this user will be stored;
  (6) sending a message to e-mail address of the user with an account number of the system of global electronic trade in the Internet, where the user can provide a registration fee;
  (7) sending a letter by the system of global electronic trade in the Internet to the user in case of a payment of the registration fee by the user, where this letter includes:
    a password for entrance in the system,
    a password generator, and
    a mail notification of receiving of the letter with a confirmation by a post office of the location address of the legal entity and the name of the legal entity;
  (8) deleting of the user domain in case of absence of the payment of the registration fee during a certain period;
  (9) activation of the user in the system and providing of the user by a registration number of user of the system of global electronic trade in the Internet, in case of the confirmation by the post office of the location address of the legal entity and the name of the legal entity;
  (10) creating of electronic codes of the signature and of the seal of the legal entity by the system of global electronic trade in the Internet; and
  (11) deleting of the user domain and returning the registration fee to the user in case of an absence of the confirmation by the post office of the location address of the legal entity and the name of the legal entity;

c) creating of the database of confidential information about legal entities for preparation of contracts and other official documents in a frame of the system of global electronic trade in the Internet on the basis of data, provided by users during registration, where this database comprises for a legal entity:
  (1) a name of the legal entity;
  (2) a state registration number of the legal entity;
  (3) a date of registration of the legal entity by a state agency;
  (4) a legal address of the legal entity;
  (5) a location address of the legal entity;
  (6) a e-mail address and a telephone number of the legal entity;
  (7) a name and a job position of an official representative of the legal entity, who can sign contracts and other official documents on a behalf of the legal entity;
  (8) a scanned signature of the official representative of the legal entity, who can sign contracts and other official documents on the behalf of the legal entity;
  (9) an electronic code of the signature of the official representative of the legal entity, who can sign contracts and other official documents on the behalf of the legal entity;
  (10) a scanned seal of the legal entity; and
  (11) an electronic code of the seal of the legal entity;

d) creating of the database of open information about legal entities, where this database comprises for a legal entity:
  (1) a name of the legal entity;
  (2) a country of location of the legal entity;
  (3) a field of activity of the legal entity according to the Global Classification of Branches of Economy, Goods and Services;

(4) a kind of business of the legal entity (producer or intermediate party); and (5) additional information about the legal entity, which is inserted in the database optionally, including:
   a date of foundation of the legal entity,
   capacity of production or service,
   purchasing capacity,
   quality standards,
   number of employees,
   pictures of facilities, and
   an address of Web site of the legal entity;

e) creating of the database of structured information about proposed goods and services, comprising a combination of steps:
   (1) filling an application form with an offer of a seller, wherein the application form comprises data:
      a name of goods or service and a code of goods or service in conformity with the Global Classification of Branches of Economy, Goods and Services,
      a price of offered goods or service, wherein dimension of data of price of goods or service the seller chooses from a list, suggested by the system of global electronic trade in the Internet,
      a quantity of offered goods or a volume of offered service, wherein dimension of quantity of goods or volume of service the seller chooses from a list, suggested by the system of global electronic trade in the Internet,
      quality standards of offered goods or service, which the seller chooses from local or international quality standard, suggested by the system of global electronic trade in the Internet,
      main characteristics of offered goods or service, in conformity with the database of the Global Classification of Branches of Economy, Goods and Services,
      a country of location of producer, which the seller chooses from a list, suggested by the system of global electronic trade in the Internet, and
      an additional information about goods or service,
   where the system of global electronic trade in the Internet defines, during process of filling of this application form, names, codes, dimension, and a format of all abovementioned data;
   (2) recording of the data, inserted in the application form by the seller, in the database of information about proposed goods and services, where the specified data include:
      the name of goods or service and the code of goods or service in conformity with the Global Classification of Branches of Economy, Goods and Services,
      the price of offered goods or service,
      the quantity of offered goods or the volume of offered service,
      quality standards of offered goods or service,
      main characteristics of offered goods or service, in conformity with the database of the Global Classification of Branches of Economy, Goods and Services,
      the country of location of producer, and
      the additional information about goods or service,
   and where all abovementioned data are recorded in strictly certain places of the database; and
   (3) inserting into the same record of the database of information about proposed goods and services a name of a legal entity of the seller and a country of location of the seller from the database of open information about legal entities;

f) creating of the database of structured information about requests of buyers, comprising a combination of steps:
   (1) filling an application form with a request of a buyer, wherein the application form comprises data:
      a name of goods or service and a code of goods or service in conformity with the Global Classification of Branches of Economy, Goods and Services,
      a quantity of goods or a volume of service, wherein dimension of quantity of goods or volume of service the buyer chooses from a list, suggested by the system of global electronic trade in the Internet,
      main characteristics of goods or service, in conformity with the database of the Global Classification of Branches of Economy, Goods and Services,
      a desired price of goods or service, wherein dimension of data of price of goods or service the buyer chooses from a list, suggested by the system of global electronic trade in the Internet,
      a desired quality standards of goods or service, which the buyer chooses from local or international quality standard, suggested by the system of global electronic trade in the Internet,
      a country of location of producer, which the buyer chooses from a list, suggested by the system of global electronic trade in the Internet, and
      an additional information about goods or service,
   where the system of global electronic trade in the Internet defines, during process of filling of this application form, names, codes, dimension, and a format of all abovementioned data;
   (2) recording of the data, inserted in the application form by the buyer, in the database of information about requests of buyers, where the specified data include:
      the name of goods or service and the code of goods or service in conformity with the Global Classification of Branches of Economy, Goods and Services,
      the quantity of goods or the volume of service,
      main characteristics of goods or service, in conformity with the database of the Global Classification of Branches of Economy, Goods and Services,
      the desired price of goods or service,
      desired quality standards of goods or service,
      the country of location of producer, and
      the additional information about goods or service,
   and where all abovementioned data are recorded in strictly certain places of the database; and
   (3) inserting into the same record of the database of information about requests of buyers a name of a legal entity of the buyer and a country of location of the buyer from the database of open information about legal entities;

g) searching of trade partners by buyers in the database of structured information about proposed goods and services by means of the system of global electronic trade in the Internet, where the searching comprises a combination of steps:
   (1) filling an application form with request of a buyer, where the application form includes a name of goods or service and a code of goods or service in conformity with the Global Classification of Branches of Economy, Goods and Services;

(2) searching the goods or service in the database of information about proposed goods and services on the basis of the code of the Global Classification of Branches of Economy, Goods and Services, where the searching is uniquely defined, because codes of the same goods or services coincide both in the request of the buyer, and in the database of information about proposed goods and services;

(3) forming of a list of results of search of buyer, wherein the list of results of search of buyer has the same structure, as the database of information about proposed goods and services and wherein the list of results of search of buyer includes for every goods or service:
a name of goods or service,
a price of goods or service,
quality standards of goods or service,
main characteristics of goods or service,
a name of a legal entity of a seller,
a quantity of goods or a volume of service,
an additional information about goods or service, and
a country of location of a seller;
and wherein the list of results of search of buyer is cached on a server side; and (4) completion of searching, if the received result satisfies the buyer;

h) sorting of data by buyers from the list of results of search of buyer, where the sorting comprises a combination of steps:
(1) choice of a criterion of sorting of data from the list of results of search of buyer by a buyer, where criterions of sorting include:
a price of goods or service,
quality standards of goods or service,
main characteristics of goods or service,
names of legal entities of sellers,
a quantity of goods or a volume of service, and
a country of location of a seller;
(2) sorting of data from the list of results of search of buyer by the system of global electronic trade in the Internet in accordance with the chosen criterion of sorting; and
(3) getting a list of results of sorting, which has the same size that the list of results of search of buyer;

i) selecting of trade partners by buyers from the list of results of search of buyer with help of an interactive or an automatic modes of selecting of data, where (a) the selecting with help of the interactive mode of selecting of data comprises a combination of steps:
(1) choice of a first criterion for realisation of selecting of data from the list of results of search of buyer by a buyer, where criterions of selecting include:
a price of goods or service,
quality standards of goods or service,
main characteristics of goods or service,
a name of a legal entity of a seller,
a quantity of goods or a volume of service, and
a country of location of a seller;
(2) selecting of data from the list of results of search of buyer on the basis of the first criterion of selecting by the system of global electronic trade in the Internet and completion of selecting of trade partners, if obtained result satisfies the buyer;

(3) choice by the buyer of a second criterion for realisation of selecting of data from the list of results of selecting, received on the previous step, if obtained result does not satisfy the buyer;
(4) selecting of data from the list of results of selecting, received on the previous step, on the basis of the second criterion of selecting by the system of global electronic trade in the Internet and completion of selecting of trade partners, if a received result satisfies the buyer, and so on to a last criterion of selecting;
(5) analysis of results of selecting; and
(6) forming a list of possible trade partners, wherein the list of possible trade partners is smaller than the list of results of search of buyer;

(b) and where the selecting with help of the automatic mode of selecting of data comprises a combination of steps:
(1) choice of criterions for realisation of selecting of data from the list of results of search of buyer by a buyer, where criterions of selecting include:
a price of goods or service,
quality standards of goods or service,
main characteristics of goods or service,
a name of a legal entity of a seller,
a quantity of goods or a volume of service, and
a country of location of a seller;
(2) definition of priorities of criterions of selecting by the buyer;
(3) selecting of data from the list of results of search of buyer by the system of global electronic trade in the Internet on the basis of priorities of criterions of selecting, including at a beginning selecting on the basis of criterion, having a first priority, then selecting of data from received result on the basis of criterion, having a second priority, and so on to latest from chosen criterions;
(4) analysis of results of selecting; and
(5) forming a list of possible trade partners, where the list of possible trade partners is smaller than the list of results of search of buyer;

j) searching of trade partners by sellers in the database of structured information about requests of buyers by means of the system of global electronic trade in the Internet, where the searching comprises a combination of steps:
(1) filling an application form with request of a seller, where the application form includes a name of goods or service and a code of goods or service in conformity with the Global Classification of Branches of Economy, Goods and Services;
(2) searching the goods or service in the database of information about requests of buyers on the basis of the code of the Global Classification of Branches of Economy, Goods and Services, where the searching is uniquely defined, because codes of the same goods or services coincide both in the request of the seller, and in the database of information about requests of buyers;
(3) forming of a list of results of search of seller, wherein the list of results of search of seller has the same structure, as the database of information about requests of buyers and wherein the list of results of search of seller includes for every goods or service:
a name of goods or service,
a quantity of goods or a volume of service,
a price of goods or service, quality standards of goods or service,
main characteristics of goods or service,
a name of a legal entity of a buyer,
an additional information about goods or service, and
a country of location of a buyer;
and wherein the list of results of search of seller is cached on a server side; and
   (4) completion of searching, if the received result satisfies the seller;

k) sorting of data by sellers from the list of results of search of seller, where the sorting comprises a combination of steps:
   (1) choice of a criterion of sorting of data from the list of results of search of seller by a seller, where criterions of sorting include:
      a quantity of goods or a volume of service,
      a price of goods or service,
      quality standards of goods or service,
      main characteristics of goods or service,
      a country of location of a buyer, and
      names of legal entities of buyers;
   (2) sorting of data from the list of results of search of seller by the system of global electronic trade in the Internet in accordance with the chosen criterion of sorting; and
   (3) getting a list of results of sorting, which has the same size that the list of results of search of seller;

l) selecting of trade partners by sellers from the list of results of search of seller with help of an interactive or an automatic modes of selecting of data, where
(a) the selecting with a help of the interactive mode of selecting of data comprises a combination of steps:
   (1) choice of a first criterion for realisation of selecting of data from the list of results of search of seller by a seller, where criterions of selecting include:
      a quantity of goods or a volume of service,
      a price of goods or service,
      quality standards of goods or service,
      main characteristics of goods or service,
      a country of location of a buyer, and
      a name of a legal entity of a buyer;
   (2) selecting of data from the list of results of search of seller on the basis of the first criterion of selecting by the system of global electronic trade in the Internet and completion of selecting of trade partners, if obtained result satisfies the seller;
   (3) choice by the seller of a second criterion for realisation of selecting of data from the list of results of selecting, received on the previous step, if obtained result does not satisfy the seller;
   (4) selecting of data from the list of results of selecting, received on the previous step, on the basis of the second criterion of selecting by the system of global electronic trade in the Internet and completion of selecting of trade partners, if a received result satisfies the seller, and so on to a last criterion of selecting;
   (5) analysis of results of selecting; and
   (6) forming a list of possible trade partners, wherein the list of possible trade partners is smaller than the list of results of search of seller;
(b) and where the selecting with help of the automatic mode of selecting of data comprises a combination of steps:
   (1) choice of criterions for realisation of selecting of data from the list of results of search of seller by a seller, where criterions of selecting include:
      a quantity of goods or a volume of service,
      a price of goods or service,
      quality standards of goods or service,
      main characteristics of goods or service,
      a country of location of a buyer, and
      a name of a legal entity of a buyer;
   (2) definition of priorities of criterions of selecting by the seller;
   (3) selecting of data from the list of results of search of seller by the system of global electronic trade in the Internet on the basis of priorities of criterions of selecting, including at the beginning selecting on the basis of criterion, having a first priority, then selecting of data from received result on the basis of criterion, having a second priority, and so on to latest from chosen criterions;
   (4) analysis of results of selecting; and
   (5) forming of a list of possible trade partners, wherein the list of possible trade partners is smaller than the list of results of search of seller;

m) holding of tenders by buyers in a frame of the system of global electronic trade in the Internet, wherein a tender, which is holding by a buyer, is a competition, which the buyer holds among sellers of goods or services, which the buyer wishes to buy, and where the holding of the tender by the buyer comprises a combination of steps:
   (1) filling an application form about an announcement of the tender, where the buyer, as an organizer of the tender, determines parameters of a competition, namely:
      a name of goods or service, which the buyer want to buy, and a code of goods or service in conformity with the Global Classification of Branches of Economy, Goods and Services,
      a quantity of goods or a volume of service,
      quality standards of goods or service,
      main characteristics of goods or service,
      a desired price of goods or service,
      a time frame for accepting documents for the tender, and
      a time, when a result of the tender will be declared;
   (2) searching of potential participants of the tender by the system of global electronic trade in the Internet in the database of the structured information about proposed goods and services on the basis of the name of goods or service, which the buyer want to buy, and on the basis of code of this goods or service in conformity with the Global Classification of Branches of Economy, Goods and Services;
   (3) creating of a list of results of search of potential participants of the tender by the system of global electronic trade in the Internet;
   (4) automatic selecting of data from the list of results of search of potential participants of the tender by the system of global electronic trade in the Internet and creating of a list of results of selecting of potential participants of the tender;
   (5) notification of the potential participants about the tender, which is carried out either through automatic sending of messages about the tender to potential participants on the basis of the list of results of selecting of potential participants of the tender or through automatic sending of messages about the tender to sellers, selected by the organizer of the tender;

(6) sending of required data to the organizer of the tender by participants of the tender;

(7) analyzing of received documents and taking a decision by the organizer of the tender;

(8) declaration of a result of the tender by means of publishing this result on a special page of the system of global electronic trade in the Internet, what are available for participants of competition only; and (9) conclusion of a contract in the frame of the system of global electronic trade in the Internet between the organizer of the tender and a winner of the competition;

n) holding of tenders by sellers in a frame of the system of global electronic trade in the Internet, wherein a tender, which is holding by a seller, is an auction, which the seller bids in order to sell goods or services, and where the holding of the tender by the seller comprises a combination of steps:

(1) filling an application form for an announcement of the tender, where the seller, as an organizer of the tender, declares goods or a party of goods for sale, an initial price, a time frame for an auction and other parameters for holding the tender;

(2) searching of potential participants of the tender by the system of global electronic trade in the Internet in the database of the structured information about requests of buyers on the basis of name of goods or service, proposed for sale, and on the basis of code of this goods or service in conformity with the Global Classification of Branches of Economy, Goods and Services;

(3) creating of a list of results of search of potential participants of the tender by the system of global electronic trade in the Internet;

(4) automatic selecting of data from the list of results of search of potential participants of the tender by the system of global electronic trade in the Internet and creating of a list of results of selecting of potential participants of the tender;

(5) notification of the potential participants about the tender, carried out either through automatic sending of messages about the tender to potential participants on the basis of the list of results of selecting of potential participants of the tender, or by automatic sending of messages about the tender to buyers, selected by the organizer of the tender;

(6) familiarization with characteristics of the offered goods and other conditions of the auction of buyers and a confirmation of their participation in the auction;

(7) holding an on-line auction by the seller for participants of the auction; and (8) conclusion of a contract in the frame of the system of global electronic trade in the Internet between the organizer of the tender and a winner of the auction;

o) conducting of transactions between trade partners in a frame of the system of global electronic trade in the Internet, wherein conducting of transactions between trade partners comprises a combination of steps:

(1) conducting negotiations;

(2) concluding of a contract in case of successful negotiation in the frame of the system of global electronic trade in the Internet or out of it, wherein concluding of the contract in case of successful negotiation in the frame of the system of global electronic trade in the Internet comprises a combination of steps:

choosing of a standard form of the contract, proposed by the system of global electronic trade in the Internet;

automatic filling by the system of global electronic trade in the Internet of main data about trade partners in the form of the contract from the database of confidential information about legal entities;

filling main requisites into the contract according to International legal regulations, where the main requisites at least include: a name of goods or services, and a quantity of sold goods or services;

filling additional paragraphs into the contract, if the trade partners so desire;

signing the contract with an electronic signature;

setting of an electronic seal in the contract for users, having seal according to articles of associations;

verifying of codes of the electronic signature and the seal;

automatic setting of scanned signatures and seals in a specified location of the contract;

automatic registration of the contract and storing the contract in the database of confidential information about legal entities without a possibility to insert any one-sided changes to the contract;

automatic recording of information about the contract, concluded in the frame of the system of global electronic trade in the Internet, for every participant of transaction in the database of open information about legal entities;

making the contract accessible for every party; modification of the contract on mutual assent of parties by means of filling of a special form with electronic signatures in case of necessity; and cancellation of the contract at mutual assent of parties by means of filling of a special form with electronic signatures in case of necessity;

(3) conducting of a Controlled Advanced Payment in case of concluding of a contract in the frame of the system of global electronic trade in the Internet, comprising a combination of steps:

money transfer to an account of the system of global electronic trade in the Internet by a buyer;

automatic sending a message to a seller about the money transfer from the buyer;

delivery of goods or a performance of services according to the contract by the seller;

automatic money transfer by the system of global electronic trade in the Internet to an account of the seller, according to terms, specified in the contract, if the buyer sends no messages to the system;

filling a special form by the buyer with his electronic signature on this form, if the buyer does not get goods or services within the time frame, specified in the contract;

automatic money transfer by the system of global electronic trade in the Internet back to an account of the buyer after reception by the system of global electronic trade in the Internet of the above-mentioned form from the buyer;

filling a special form by the buyer with his electronic signature on this form, if delivered goods or performed services did not correspond to terms of the contract, and the buyer confirms, what he has sent back goods to the seller or did not accept the services;

automatic money transfer back to the account of the buyer after reception by the system of global electronic trade in the Internet of the abovementioned form from the buyer; and provision of abovementioned forms to users in a case of court proceeding; and (4) reacting of the system of global electronic trade in the Internet to possible conflict situations during realization of contracts, concluded in the frame of the system of global electronic trade in the Internet, where this reacting comprises a combination of steps:

filling a special application form by an offended party with an electronic signature in case of a breach of a contract by another party, which must be confirmed by a court decision;

automatic making of a new record in a "black-list" of the system of global electronic trade in the Internet, containing information on all users, breaching their contracts;

automatic annulment of a previously made record about the contract, concluded in the frame of the system of global electronic trade in the Internet;

filling a special application form by an offended party with an electronic signature in case of a non-fulfillment of any paragraphs of a contract by another party, what must be confirmed by a court decision; and automatic making of a new record about non-fulfillment of any paragraphs of the contract by this party in a section "Comments of partners" of the system of global electronic trade in the Internet;

p) conducting of post-transaction procedures, which at least comprise:
  (1) a delivery of goods to a buyer by means of transport of a seller or by means of a transport company, and
  (2) a payment for goods or services by a buyer at expense of own means or at expense of a credit;

q) performing of additional services by the system of global electronic trade in the Internet, comprising at least:
  (1) a detailed help for working in the system of global electronic trade in the Internet with a number of examples;
  (2) juridical services dealing with problems of electronic trade;
  (3) an analysis and a prognosis of a market, if it is required for companies, other organizations and individuals;
  (4) an insurance of cargos;
  (5) an insurance of payments;
  (6) an analysis of a global market;
  (7) an analysis of a market of some goods or services;
  (8) a publication of a magazine with an analysis of the global electronic trade; and
  (9) "Hot-line" with consultation about work of the system of global electronic trade in the Internet; and r) protecting of information in the system of global electronic trade in the Internet, comprising a combination of steps:
  (1) sending a password generator to a user together with a user password for entrance into the system of global electronic trade in the Internet during process of the registration;
  (2) requiring the user password for entrance into the system of global electronic trade in the Internet for registered users;
  (3) generating a new password by the password generator of a computer of the user for every new entrance of the user into the system of global electronic trade in the Internet on the basis of a previous password, stored on a hard disk of a computer of the user, of a date and a time of a beginning of the generation process of the new password and an IP address of user's computer;
  (4) sending the new password together with the exact time, when the new password was generated, from the computer of the user to the host server of the system of global electronic trade in the Internet;
  (5) generating a new verification password of the host server of the system of global electronic trade in the Internet on the basis of a previous password, stored in a database of the host server, on the basis of a user's IP address, stored in the database of the host server, and on the basis of the time, when the new password was generated, which received from the user;
  (6) comparison of the new password, received from the user, and the new verification password, generated by the host server;
  (7) admitting the user into the system of global electronic trade in the Internet upon of the new password, received from the user, and of the new verification password, if these passwords match;
  (8) blocking the user's domain upon of the new password, received from the user, and of the new verification password, if these passwords not match;
  (9) making a record into a security database of the host server and into the hard disk of the computer of the user with last passwords of a successful entrance into the system of global electronic trade in the Internet; and
  (10) making a record into the security database of the host server of the date and time of the generation of the new password upon successful entrance into the system of global electronic trade in the Internet.

2. The method, according to claim 1, realized for local territory: groups of countries, or a separate country or a region.

3. The method, according to claim 1, realized for trade by separate groups of goods and services.

* * * * *